US006922670B2

(12) United States Patent
Yamada et al.

(10) Patent No.: US 6,922,670 B2
(45) Date of Patent: Jul. 26, 2005

(54) USER SUPPORT APPARATUS AND SYSTEM USING AGENTS

(75) Inventors: Teruhiro Yamada, Osaka (JP); Atsushi Maeda, Osaka (JP); Tsugufumi Matsuoka, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 643 days.

(21) Appl. No.: 09/823,282

(22) Filed: Mar. 30, 2001

(65) Prior Publication Data

US 2002/0049805 A1 Apr. 25, 2002

(30) Foreign Application Priority Data

| Oct. 24, 2000 | (JP) | 2000-323559 |
| Oct. 24, 2000 | (JP) | 2000-323560 |
| Nov. 7, 2000 | (JP) | 2000-339590 |
| Nov. 28, 2000 | (JP) | 2000-360692 |
| Nov. 28, 2000 | (JP) | 2000-360731 |

(51) Int. Cl.[7] .............................................. G01L 15/22
(52) U.S. Cl. ...................... 704/270.1; 704/270; 704/275
(58) Field of Search ................................ 704/231, 246, 704/251, 270, 275, 270.1, 2–9, 277; 379/88.01

(56) References Cited

U.S. PATENT DOCUMENTS

| 6,240,405 B1 | * | 5/2001 | Suzuki | 706/45 |
| 6,427,063 B1 | * | 7/2002 | Cook et al. | 434/350 |
| 6,446,076 B1 | * | 9/2002 | Burkey et al. | 707/102 |
| 6,526,380 B1 | * | 2/2003 | Thelen et al. | 704/251 |
| 6,615,172 B1 | * | 9/2003 | Bennett et al. | 704/257 |
| 2002/0008703 A1 | * | 1/2002 | Merrill et al. | 345/473 |

* cited by examiner

Primary Examiner—Susan McFadden
(74) Attorney, Agent, or Firm—Christensen O'Connor Johnson Kindness PLLC

(57) ABSTRACT

A user support system employing agent technology is provided. The entrance server identifies the user command by matching it with a collection of anticipated user commands. An index search is performed to identify the contents of the user command. The identified user command is then used to determine which specialized server should respond to the user command. The specialized server contains a collection of action patterns for an agent to use in responding to a user command. An agent supports a user in searching for information and/or navigating to the desired information through friendly conversation with that user. The entrance server is configured as a portal site and a specialized server is provided for each specialized field.

8 Claims, 40 Drawing Sheets

FIG. 5

| user1 | CHAT, RECIPE, AUCTION |
|---|---|
| user2 | TRAVEL, PC |

| FIRST CHARACTER | USER UTTERANCE | RECORD |
|---|---|---|
| A | ASA (MORNING) | R003 |
| | ARIGATO (THANK YOU) | R112 |
| | ⋮ | ⋮ |
| K | ⋮ | ⋮ |
| | KON-NICHIWA (HELLO) | R045 |
| | ⋮ | ⋮ |

3050 — FIRST CHARACTER
3052 — USER UTTERANCE
3054 — RECORD
3038

FIG. 17

| RECORD | ENGLISH | FRENCH |
|--------|---------|--------|
| ⋮ | ⋮ | ⋮ |
| R112 | ① Thank you. (Normal)<br>② Thank you very much. (Polite)<br>⋮ | ① Merçi. (Normal)<br>① Merçi beaucoup. (Polite)<br>⋮ |
| R113 | ⋮ | ⋮ |

| user1 | CHAT, RECIPE, AUCTION |
|-------|----------------------|
| user2 | TRAVEL, PC           |

<u>4046</u>

USER SUPPORT APPARATUS AND SYSTEM USING AGENTS

BACKGROUND OF THE INVENTION

1. Field of the Invention

The present invention relates to a user support technique, particularly to a user support system that supports users' processes such as operations and information retrieval using agents.

2. Description of the Related Art

With the widespread use of the Internet and mobile phones, more and more people are using personal computers and various types of information terminals. In recent years, sales of electronic equipment such as personal computers have been increasing dramatically, and as a result, the number of beginners or persons who lack computer literacy has risen rapidly. With the remarkable improvements in CPU power, memory capacity and graphical user interfaces (GUIs), novices have been provided with methods that allow them to operate their equipment easily. Without aids like the GUI, novices would not be able to utilize many of the advanced functions their equipment can perform or access necessary information property.

Agent technology has become known and accepted as one form of user support technology. An agent is a personified character that appears on a computer display, obtains a user's command, and relays that command to the computer. The resulting computer output is then presented to the user as a response from the agent. (All user inputs are referred to as commands and all agent outputs are referred to as responses throughout.) The agent's presence can eliminate a great deal of awkwardness for the inexperienced user and give the impression that the computer is carrying on a conversation.

However, it requires a substantial amount of effort for a system administrator to properly manage and refine an agent system. The range of a human users commands is almost infinite. And while it is impossible to anticipate all of these commands, a user may expect the agent to accurately interpret any command he/she might give and provide a quick and proper response. Even if a substantial number of potential user commands are anticipated, it is very difficult for an agent system to search and identify the user's commands and provide near real-time response. Moreover, as the number of anticipated commands increases, the load on the server controlling the agent also increases, as it must handle a larger amount of data.

SUMMARY OF THE INVENTION

The invention described herein has been made to address the above-mentioned problems, and is intended to provide user support technology that permits an agent to respond quickly to a wide range of user commands and requests. The present invention is also intended to provide agent technology that will allow the agent's responses to be continuously and effectively enhanced with respect to their accuracy and flexibility.

A user support system is one aspect of the present invention. The system comprises a first block which has an electronic collection of user commands and identifies the contents of a given user command, and a second block which has an electronic collection of action patterns that enable the agent to respond to the user commands. The user command collection and the agent action collection are configured separately. In this arrangement, the user command collection and the agent action collection can be accessed independently, allowing the process of identifying the user commands and the process of determining the agent responses to be executed in parallel.

The agent is not always a visible character. It may also represent a user support program that is invisible to the user or other functions such as a back-end process in the system. The agent action patterns include agent responses, images, behaviors, or any other processes related to supporting users. The user commands and agent responses are not only verbal/auditory but may also be given in text. Commands may include any form of spoken words or sentences that can be converted into text data through a speech recognition process.

The system may include multiple second blocks, and each of the second blocks may offer a specialized service to the user. For instance, the first block and the multiple second blocks may be configured as different nodes in a network and communicate with the user via the network. In this configuration, the user may be a client and the first and second blocks may be servers, creating a client-server system.

The first block may serve as an entrance or portal server to identify the user commands, and an appropriate second block may be selected according to the contents of the identified user command. A second block may be provided for any service category, including news, fortune telling, travel, cooking, business, health and so on. In this case, since each second block has a specific theme, the agent for each second block can be easily maintained and refined. In addition, since the commands on different topics are processed on different nodes, the system load can be distributed and balanced among the nodes.

The first block may include a command search unit that searches for the user's command in the user command collection, and a reporting unit that notifies a system administrator when the user command is not found in the user command collection. When notified, the administrator can answer the user or revise the user command collection and the agent action collection.

The system may further include a recording unit that maintains a record of the user's access to the system. The second block may then choose one of several possible agent actions in response to the user's command, depending upon the history of the user's access.

The first block may further include an index storing unit that stores an index of the contents of the user command collection. The search unit can then perform an initial index-search for the given user command to narrow the search scope and improve the search speed.

The search unit may also perform a full text search for the user command. The full text search here means that the user command is matched with all commands registered in the user command collection and compared on a full text basis. Although the full text search can be performed independently from the index search, it may be preferable to perform the index search to narrow the search scope before performing the full text search. In other words, the system designer can register many user commands without concern over their similarity and as a result a user command can be easily searched by the full text search. By using the full text search to, identify user commands, the user's intent can be identified precisely and the agent's response can be very accurate. Thus, the index search and the full text search can allow the size of the user command collection to increase without sacrificing system performance.

Still another object of the present invention is to provide a translation system as a convenient communication tool with excellent performance.

A translation system is provided as an aspect of the present invention. The translation system comprises a first block that contains an electronic collection of user commands and identifies the contents of a given user command, and a second block that has an electronic dictionary file for translating the user command and provides the user with an expression corresponding to the command in another language. The first block and the second block are configured as different nodes accessing the network so that the user command collection and the dictionary file are separately constructed. The first block may be called the entrance server since it receives the user command, while the second block may be called the translation server since it is in charge of the translation. The translation server may be divided into multiple servers, and each server may deal with a specialized field. For instance, each server may be separately configured for a topic such as scientific technology, daily conversation, politics, the economy, or the like. The entrance server may be used to determine which server is most appropriate to handle the user command.

The first and second blocks are separately configured as different network nodes in order to distribute the processes of identifying and translating the user commands. The first and second blocks may be configured as servers that are accessed by the user terminal. Such distributed processing can improve overall system performance and make the maintenance and enhancement processes easier. If translation servers are provided for each specialized field, each of the servers can be maintained independently.

An example of the translation system is the English translation "Good morning" of the Japanese command "Ohayo". The system may include a target language setting unit that enables the user to set a translation language or a target language.

The first block may include a command search unit that searches for the user's command in the user command collection, and the reporting unit that notifies the system administrator when the user command is not found in the user command collection. Thereby the administrator can revise the user command collection and the dictionary file.

Thus, the translation system comprises an electronic collection of user commands, a command search unit that identifies the contents of a given user command using the user command collection, a dictionary file that describes the relationship between multiple languages for anticipated user commands, a function block that offers predefined services to the user, a target language setting unit which sets the translation language that will be used by any number of users who assemble virtually to utilize the offered service, and a corresponding expression search unit. The expression search unit compares the contents of a user command, which is identified by the command search unit, with the dictionary file and identifies the expression that corresponds to the users' command in the target language. The function block then offers the corresponding expression retrieved using the said service.

The predefined services include any service in which a translation between multiple languages can be utilized. Multiple users may assemble virtually to make use of the translation service on the Internet by accessing a predefined Web page. Those users may then converse in their native languages.

In this aspect of the present invention, when a user gives a command, it is translated to a corresponding expression in the target language and embedded in the service. Therefore each of the system's users can receive the service in their native language. The system can be applied to a chat service shared by people speaking different languages or a network role-playing game (RPG) in which many users from different countries can participate. The system can also be applied to single user applications, such as online shopping or a ticket booking service offered in a foreign language.

The function block may be used to customize the service for each user on a target language basis by embedding a corresponding expression in each user's native language into the service offered. If a multilingual user speaks five languages, there could be five corresponding expressions, but the service may be sufficient for the user even when offered only in their native language.

The user support apparatus is another aspect of the present invention. The apparatus comprises a first block that contains an electronic collection of user commands and identifies the contents of a given user command, and a second block that contains an electronic collection of action patterns for the agent and enables the agent to respond to the user commands. The user command collection includes a general command library that stores general user commands and a specialized command library that stores commands related to the agent's specialized field.

The general command library may be configured as a natural language library such as a dictionary for a kana-to-kanji converting system in a Japanese word processor. It is not necessary to configure the general command library and the specialized command library separately.

The user support system forms another aspect of the present invention. In the system, multiple user support apparatuses are provided, one for each specialized field, and these multiple user support apparatuses are connected to the network as separate network nodes that are configured to be accessible to each user.

A server that includes the specialized command libraries for all of the user support apparatuses within the user support system may be included. This server may function as an entrance server or portal server that can identify all user commands to be processed by the user support system. The entrance server may select the appropriate server to respond to a user based upon the contents it identifies in the users command.

Another object of the present invention is to provide a user support technology that will enable a user to obtain the information he/she desires in a friendly environment and that will smoothly execute the user's desired processes on a computer or other apparatus.

The user support apparatus comprises a command identification block that has an electronic collection of user commands and identifies the contents of a given user command, and a response block that has an electronic collection of action patterns that enable the first agent to respond to user commands. The command identification block has an additional collection of anticipated commands that a second agent may make to the user, to which the first agent should react, and it identifies the contents of the second agent's command if it exists in the additional command collection. The response block has an additional collection of action patterns that the first agent can then use to react to the commands of the second agent, which occasionally enables the first agent to react directly to the second agent.

Agent is used here as the generic name of a function for supporting a user's search for information or navigation to desired information, and that function primarily consists of a personified character that appears on screen and converses with the user. The first agent is implemented on the user support apparatus and acts within it, while the second agent may act outside of the user support apparatus. While the second agent and the user converse, the first agent can react if the conversation is related to its interests, even when the first agent has not been talking with the user.

Multiple user support apparatuses are provided, corresponding with the specialized fields in the system, and each user support apparatus is connected to the network as a separate network node. The additional command collection, the agent action collection, and the additional action collection for each user support apparatus are generated according to the specialized field each represents.

In this system, the multiple user support apparatuses may include the respective response blocks therein and share the command identification block at any one of the network nodes. In this configuration, the shared command identification block may include the user command collections of all other apparatuses.

In this system, each user support apparatus may host the first agent, and if the first agent appears on any other apparatus, the first agent may act as a second agent on that apparatus.

Moreover, any arbitrary combination of the abovementioned structural components in the present invention is still effective as an embodiment when applied as a method, a system, a server, a terminal, a computer program, or any other embodiment.

This summary of the invention does not describe all necessary features, so the invention may also be a subcombination of these described features.

BRIEF DESCRIPTION OF THE DRAWINGS

FIG. 5 is the internal structure of the access information file in the originating server.

FIG. 15 is the internal structure of the user command collection in the entrance server.

FIG. 17 is the data structure of the dictionary file in the translation server.

FIG. 28 is the internal structure of the access information file in the originating server.

DETAILED DESCRIPTION OF THE INVENTION

The invention is now described on the basis of the preferred embodiments, which are not intended to limit the scope of the present invention, but serve to exemplify it. All of the features and combinations thereof described in the embodiment are not necessarily essential to the invention.

Figure 1:
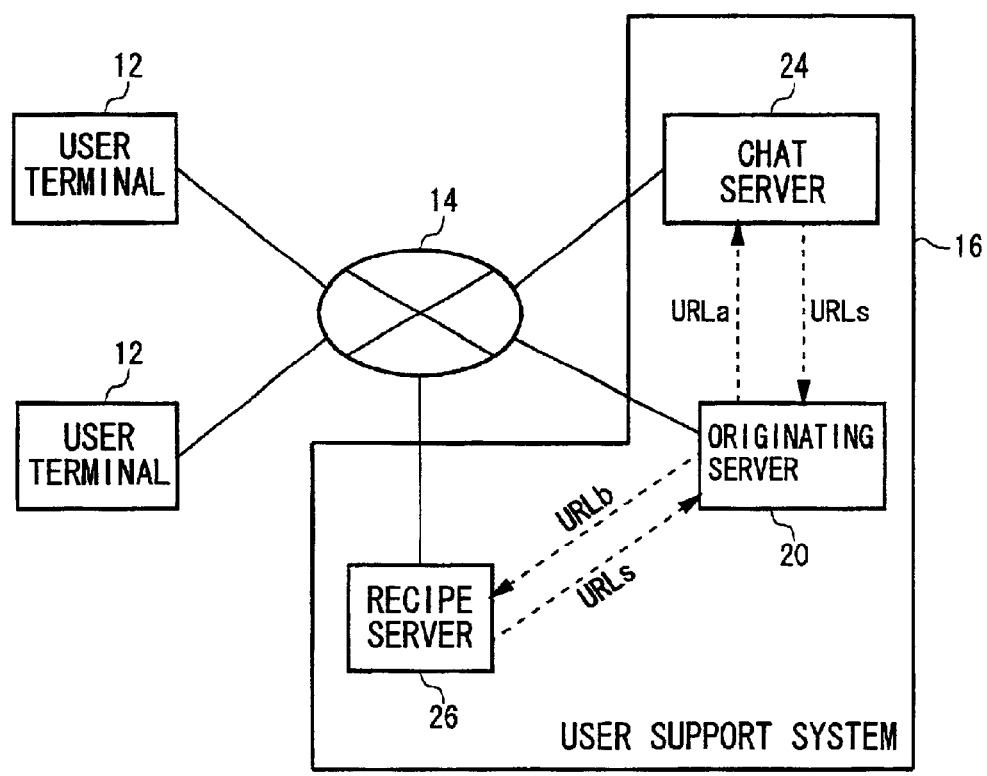
FIG. 1 is the overall structure of the network system including the user support system according to the first embodiment.

FIG. 1 shows the overall structure of the network system 10, including the user support system 16, according to the first embodiment of the present invention. Here the user terminal 12 and the user support system 16 are connected to each other via the Internet 14. The user terminal 12 is a personal computer, a Personal Digital Assistant (PDA), a mobile phone with Internet access 14, or any other suitable hardware device.

The user support system 16 includes the originating server 20, the chat server 24, and the recipe server 26. The originating server 20 is the first processing block, and the latter servers are the second processing blocks. These three servers are connected to the Internet 14. Thus, the originating server 20, the chat server 24, and the recipe server 26 are configured as separate network nodes, and therefore the processing of user commands and agent responses can be distributed among the servers. Since an agent performing in a different field can also be implemented in a different node, maintenance can easily be carried out on each of the agents. The names "chat server" and "recipe server" are assigned according to the allotted or specialized field of the agent. Throughout this application, servers such as the chat server 24 and the recipe server 26 are generally referred to as specialized servers, and agents placed on these servers are referred to as expert agents. Although the user support system 16 may be configured as one unit or apparatus, for instance as one component within a portal site, it is assumed in the following that the system is configured as separate nodes and the originating server 20 serves as the portal server for the user terminal 12.

Although full details are given below, the abstract of the process in FIG. 1 is as follows. When the user activates the user terminal 12, the local agent implemented inside the user terminal 12 appears on its screen. The local agent waits for the first user command. This command is referred to as the process initiating command. The process initiating command is transmitted to the originating server 20 via the Internet 14. At that time, the user terminal 12 displays a Web page from the originating server 20 on an Internet browser.

The originating server 20 has a collection of user commands, that is a collection of commands that users are expected or anticipated to use. The process initiating command is matched with the collection and the content of the command is recognized. As a result, the expert agent designated to respond to that process initiating command is identified and the URL of its specialized server, as denoted by URLa and URLb in the figure, is sent to the user terminal's 12 browser. When the user terminal 12 obtains the URL, the specialized server's Web page is displayed on the screen and the expert agent appears. The specialized server contains a collection of action patterns for the expert agent and responds to the process initiating command and subsequent user commands, which are referred to as normal commands. Although agent responses are considered to be the agent's primary behavior, the agent may also reply to the user through gestures or other actions, by changing the color or texture of its image, or by performing a search or any other program process.

When the user enters a new normal command for the expert agent, the command is captured and sent to the originating server 20, as denoted by URLs in the figure. The originating server 20 once again identifies the expert agent designated to respond to the command, then transmits the URL of its specialized server to the user terminal 12. The following sequence is repeated:

1. the originating server 20 identifies the user command;
2. the originating server 20 identifies the specialized server designated to process the identified command;
3. the expert agent on the specialized server responds to the user; and
4. the expert agent requests or prompts the user to enter a normal command.

Thus, the process always returns to the originating server 20 and restarts from there. It is for this reason that the server is named the originating server.

Figure 2:
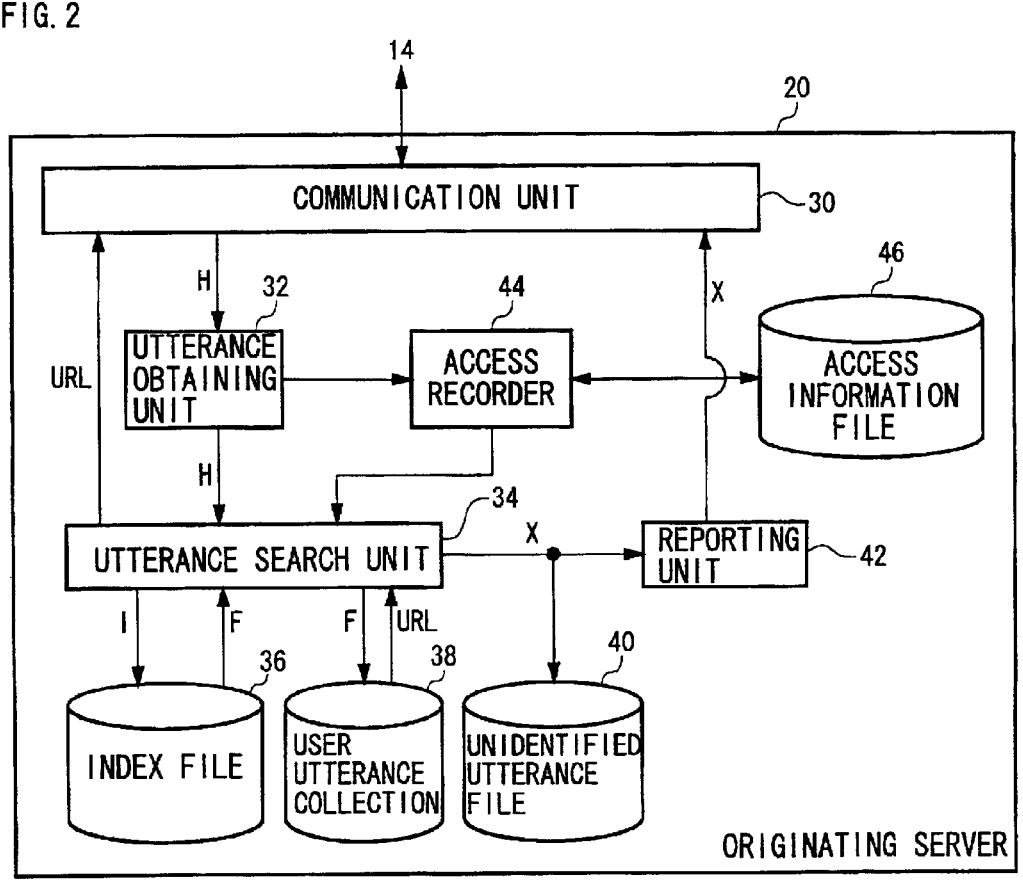
FIG. 2 is the internal structure of the originating server in the user support system.

FIG. 2 shows the internal structure of the originating server 20. In this figure, "H" indicates command data, "I" indicates an index search for the command, "F" indicates the file name containing the URL of the specialized server designated to respond to the user's command, and "X" indicates an unidentified command. The structure shown in FIG. 2 may be implemented using a CPU, memory, and a program loaded in the memory. In the figure, however, the blocks are not divided in terms of hardware and/or software components, but rather in terms of function. Those skilled in the art can therefore understand that various combinations of hardware and software components can achieve the functions of these blocks. The same consideration is applied to the whole specification.

The communication unit 30 communicates with the specialized server and the user terminal 12 via the Internet 14. The command obtaining unit 32 captures a user command and sends it to the command search unit 34. The command search unit 34 initially checks the first character of the command with the index file 36 to search by index, then identifies the contents of the command by conducting a phrase search through the whole command. The phrase search is a process of finding any phrase that matches the command, not only by word but also by phrase. If no corresponding phrase is found, the command is divided into morphemes and a search for a closely related expression is conducted using the key word or words.

The index file 36 is generated by arranging the anticipated commands stored in the user command collection 38 in the order of the Japanese syllabary. Since the first character of the command is checked with this index file 36, the search for the command can be conducted with great speed, even if the user command collection 38 is very large. As described below, since the user command collection can easily be enhanced in this embodiment, the size of the command collection 38 can be greatly increased. In this respect, the speed gained by the initial index search is highly advantageous.

When a command is identified using the index file 36, the file descriptor for the file describing information such as the URL of the specialized server that should respond to the command is identified in the index file 36, and the file built into the user command collection 38 is opened to obtain the proper URL. The user command collection 38 has one file devoted to each command. The URL obtained from the file is forwarded to the user terminal's 12 browser via the communication unit 30 and the user terminal 12 in turn accesses the specialized server. Strictly speaking, the URL does not point to a general Web page on the specialized server, but rather a particular page that responds to the user's command. One page is allocated to each command, and in some cases, multiple pages are allocated to a single command. The latter cases are described below.

A statement corresponding exactly to the users command may not always have been previously stored in the user command collection 38. A statement that corresponds exactly will be especially hard to find during the process of enhancing the user command collection 38. In this case, the command search unit 34 breaks the user's command into morphemes by a known method and finds the most probable command in the user command collection 38 by conducting another search employing a logical AND of the morpheme's nouns or by similar processes. Each command for which the second search is unsuccessful is recorded as an unidentified command in the unidentified command file 40, and the originating server's 20 administrator is notified via the communication unit 42 by electronic mail or similar device. The administrator then prepares a new registration for the unidentified command and lists the URL of the page on the specialized server that should respond to the command in the user command collection 38. The administrator then registers the index of the command in the index file 36 and designs processes including responses for the expert agent on that page. For this kind of maintenance, the unidentified command can be added directly to the user command collection 38 and no complicated process is involved. Therefore, it is very easy to enhance the user command collection 38.

An access recorder unit 44 captures the status of each user's access to the specialized server in the access information file 46. This enables the expert agent to respond differently to identical user commands. For instance, when a user who first visits the chat server 24 says "Hello", the chat servers 24 expert agent, also referred to as the chat agent, will say "Nice to meet you". However, if the user visits the chat server 24 again, the chat agent will say "Hello. How's it going?" Therefore, a certain sensitivity of response can be realized. The access recorder unit 44 notifies the command search unit 34 of the user's access status. If multiple pages of the specialized server are employed in the user command collection 38 in order to respond to a user command, as in this example, the command search unit 34 chooses the appropriate page under the user access status and sets the user terminal's 12 browser to that page.

Figure 3:
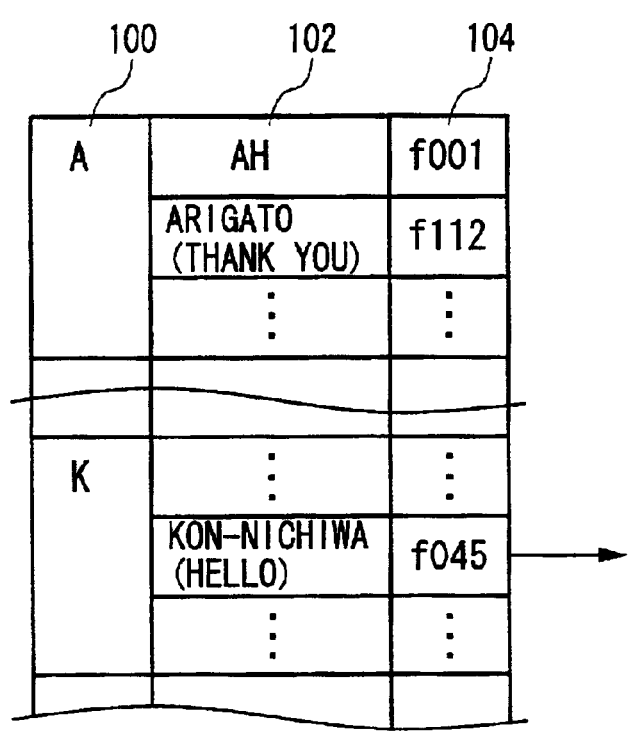
FIG. 3 is the internal structure of the index file in the originating server.
Figure 4:
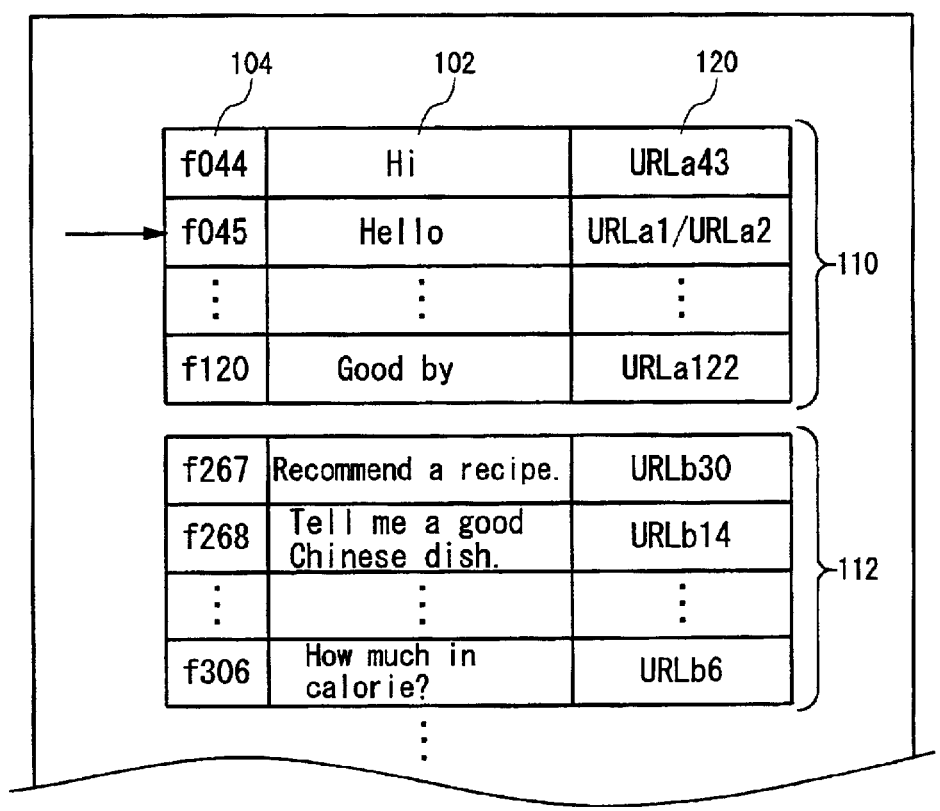
FIG. 4 is the internal structure of the user command collection in the originating server.

FIG. 3 is the internal structure of the index file 36. FIG. 4 is the internal structure of the user command collection 38. The index file 36 has a Japanese syllabary column 100, a user command column 102, and a file name column 104. The user commands are arranged in the order of the Japanese syllabary. If the first character is "A", the command is categorized corresponding to "A" of the Japanese syllabary column 100.

The user command collection 38 has a file name column 104, a user command column 102, and a page column 120 of the specialized server designated to respond to the user. For instance, the page on the specialized server designated to respond to the command "Hi" is URLa43, and the pairing of the command "Hi" with URLa43 indicates the file f044. The user commands are gathered for each specialized server. For instance, the user commands 110 which are linked to the chat server 24 are combined into one group, while the user commands 120 linked to the recipe server 26 are combined into another group. The former command grouping relates to general greetings and such, while the latter grouping relates to cooking and recipes. The index file 36 and the user command collection 38 are linked together via file names. For instance, the file name f045 is recorded corresponding to the command "Hello" in the index file 36, and the file name points to the file f045 in the user command collection 38.

As shown in FIG. 4, two pages, URLa1 and URLa2, correspond to "Hello". URLa1 will be sent to a user upon their first visit to the chat server 24 and URLa2 will be sent to a user upon each subsequent visit.

FIG. 5 illustrates the internal description of the access information file 46. In this figure, the user "user1" has visited the specialized servers called "chat", "recipe", and "auction" previously, while the user "user2" has already visited the specialized servers named "travel" and "PC". Therefore, as stated above, when "user2" visits the chat server 24, the chat agent will begin with a greeting prepared for first-time visitors. When "user1" visits the chat server 24, the chat agent will produce a greeting prepared for returning visitors.

Figure 6:
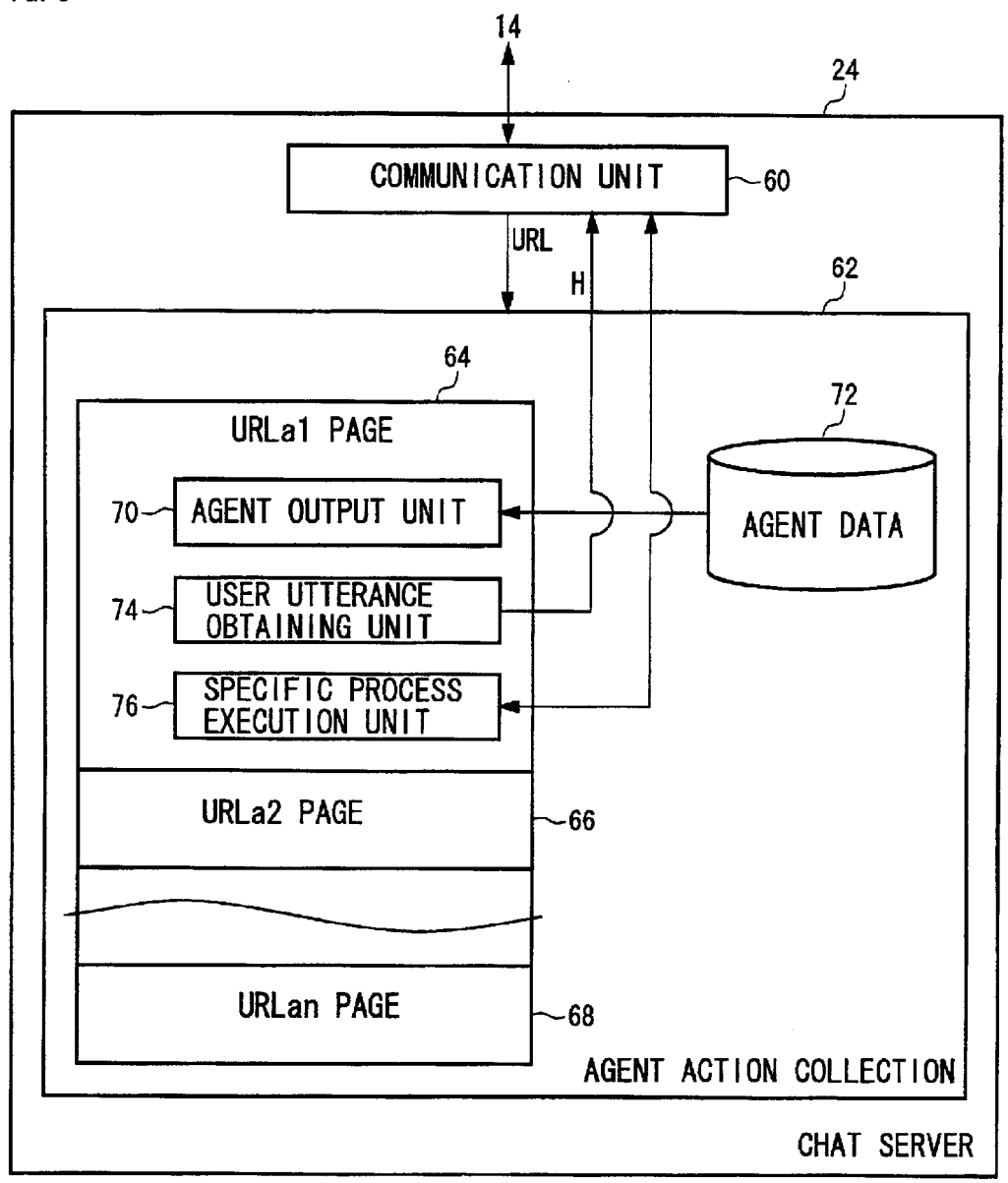
FIG. 6 is the internal structure of the chat server in the user support system.

FIG. 6 is the internal structure of the chat server 24 and serves as an example of a specialized server. The communication unit 60 communicates with the user terminal 12 and the originating server 20 via the Internet 14. The URL identified in the command search unit 34 of the originating server 20, for instance URLa1 or URLa2 corresponding to the greeting "Hello" as in FIG. 4, is forwarded to the agent action collection 62 via the communication unit 60. The agent action collection 62 includes agent data 72 that describes images and action patterns of the expert agent as well as its commands. One page corresponding to one URL identified by the command search unit 34 is also provided. For instance, page 64 corresponds to URLa1, page 66 to URLa2, and page 68 to URLan. The pages are Web pages that not only carry the chat agent's commands, but also display its image and behavior, and perform services such as information retrieval using the agent. Thus, fully flexible responses can be realized by providing one Web page for each command.

Each page has almost the same configuration, so only page 64 corresponding to URLa1 is described in detail. Page 64 has an agent output unit 70, a user command obtaining unit 74, and a specific process execution unit 76. These units are realized by using a Common Gateway Interface (CGI) script that is a back-end process running behind the Web page. The agent output unit 70 responds to the user command through the chat agent on the basis of the agent data 72. The specific process execution unit 76 performs any process other than responding to commands. For instance, it is capable of retrieving information and executing various types of programs. If the user command that brought the user to this page is "I want to know today's news." the chat agent will search the news through the Internet 14 and present it to the user. The user command obtaining unit 74 thereafter obtains a normal command from the user and notifies the originating server 20. As a result, the originating server 20 identifies a new specialized server.

Figure 7:
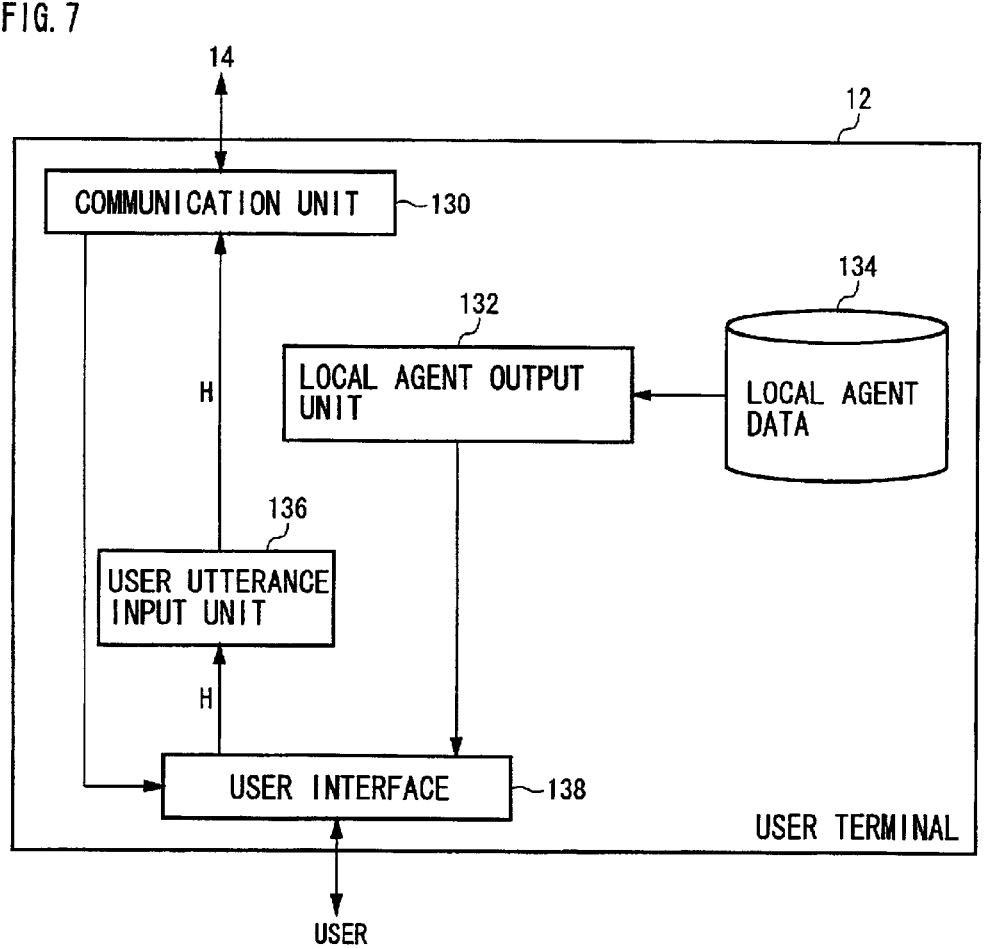
FIG. 7 is the internal structure of the user terminal used to access the user support system.

FIG. 7 shows the internal structure of the user terminal 12. The communication unit 130 communicates with the originating server 20, the chat server 24, the recipe server 26, and other specialized servers via the Internet 14. The user interface 138 is a general term for the whole structure used to encourage a user to make a decision and enable them to input it. The user interface includes a keyboard, a mouse, a display, and other types of data interfaces. The local agent output unit 132 reads local agent data 134 and forwards it to the user via the user interface 138. The user's process initiating command and normal commands are forwarded to the user command input unit 136 and then sent to the originating server 20 via the communication unit 130 and the Internet 14. The processes described in the configuration above are detailed in the following examples.

Figure 8:
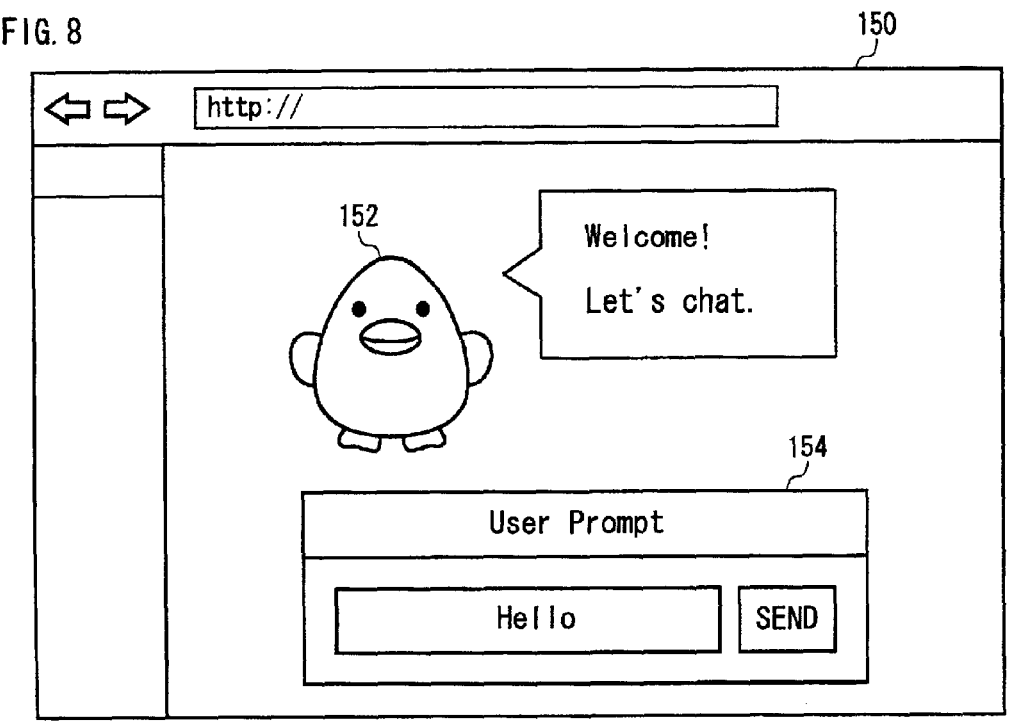
FIG. 8 shows the local agent displayed on screen when the user has activated the user terminal.

FIG. 8 shows the screen 150 displayed when a user has activated the user terminal 12. The local agent 152 appears and says, "Welcome! Let's chat." The user inputs "Hello" in the input field 154 and presses the send button. The screen may be configured in such a manner that the input field 154 appears when the user clicks the local agent 152. In this case, as long as the user does not click it, the local agent 152 may continue chatting or encourage the user to talk by asking a question. Once the statement "Hello" has been entered, it is sent to the originating server 20 as a process initiating command and the chat server 24 is identified as the appropriate specialized server on the basis of the contents of the statement. The user terminal 12 is then given access to the corresponding page.

Figure 9:
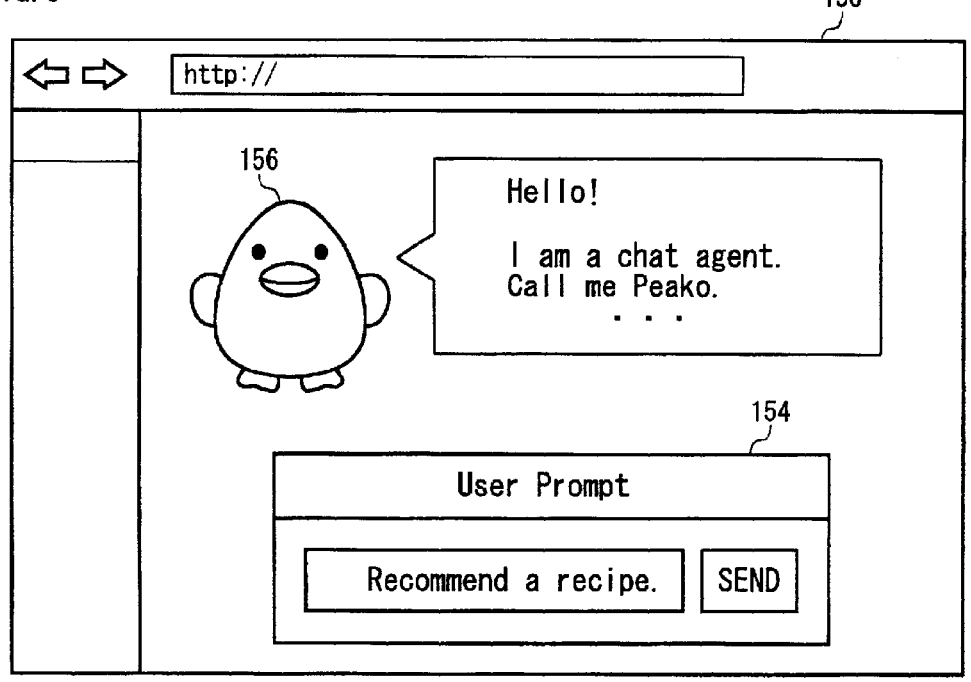
FIG. 9 shows the chat agent displayed on screen when the user enters a command.

FIG. 9 shows the screen 150 displayed when the user enters a command. Here the chat agent 156 appears, but the same image as the local agent 152 is used in this embodiment so the conversation appears to continue seamlessly. The chat agent 156 says, "Hello. I am a chat agent. Call me Peako." When the user inputs "Recommend a recipe" and sends it, the originating server 20 receives the command and a page on the recipe server 26 is identified. The identified page's URL is then sent to the user terminal 12 and the user terminal 12 is given access to that page.

Figure 10:
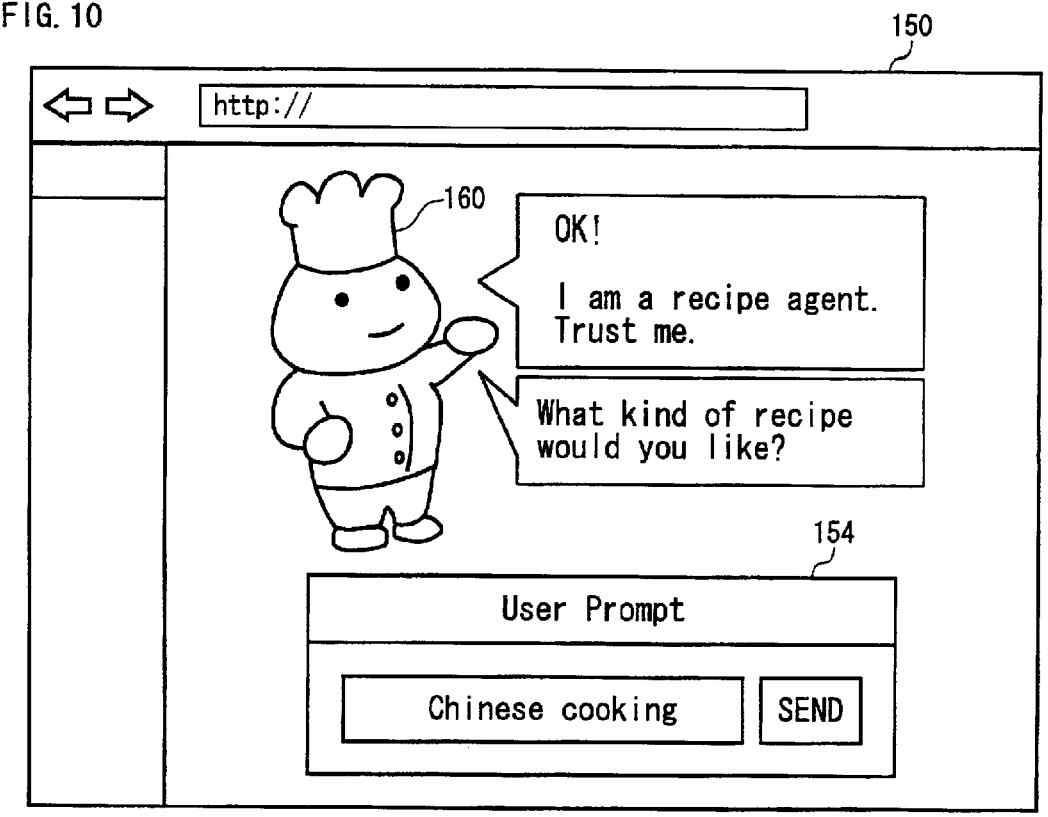
FIG. 10 shows the menu agent displayed on screen when the user asks for a recipe.

FIG. 10 shows the screen 150 displayed when the user asks for a recipe. The recipe agent 160 appears and says, "OK! I am a recipe agent. Trust me." Then the agent asks, "What kind of recipe would you like?" The additional question is posed to the user because there could be many recipe choices and it is necessary to obtain a hint to narrow the scope of the search. The user inputs "Chinese cooking" and selects send. Although this normal command is sent to the originating server 20, the specialized server identified is still the recipe server 26 and the user is simply given access to another page on that server.

Figure 11:
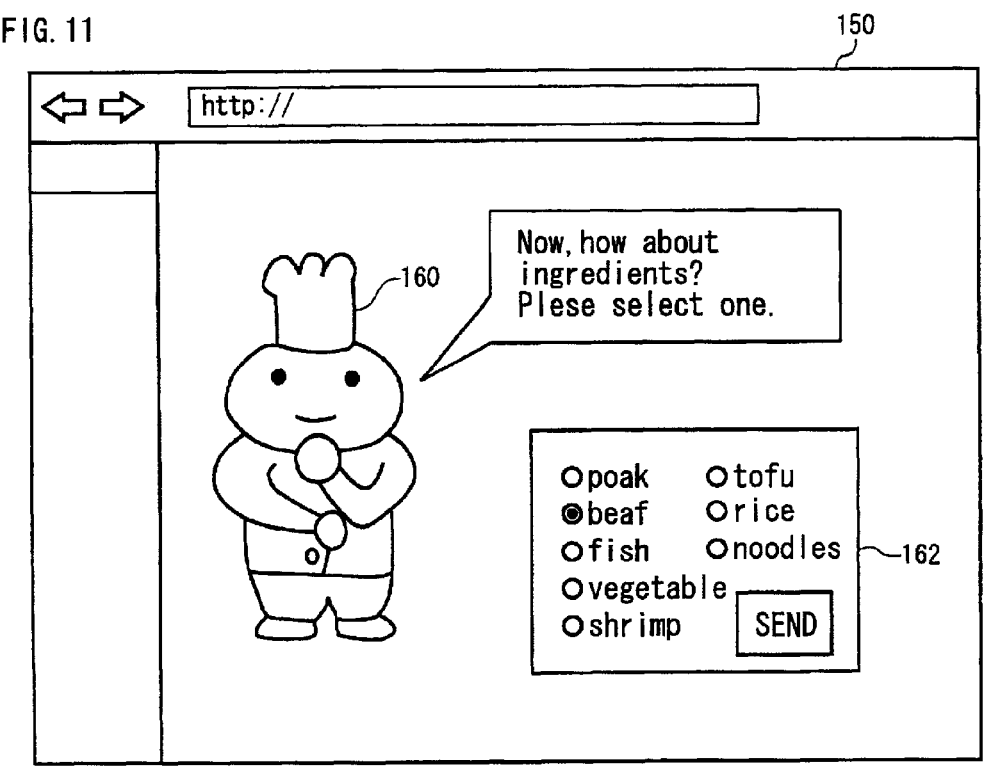
FIG. 11 shows how the recipe agent asks the user to provide a hint to narrow the scope of the search.

FIG. 11 shows the screen 150 displayed when the user gives a hint to narrow the search. Here the recipe agent 160 asks, "Now, how about ingredients? Please select one." in order to further specify the search. A menu 162 appears in the lower portion of the screen 150, displaying several ingredient choices with radio buttons beside them. Choices include items such as pork, beef, and fish. The user may then make a selection, such as "beef", and press the send button.

Figure 12:
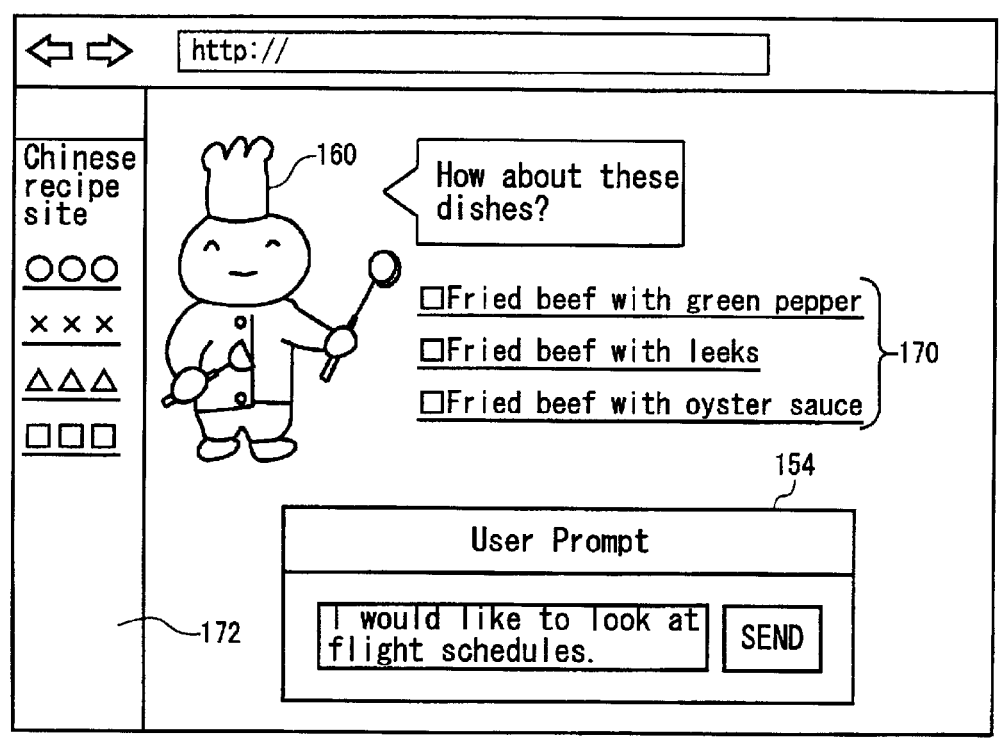
FIG. 12 shows how the recipe agent presents the search results to the user.

FIG. 12 shows the screen 150 that displays the search results. The screen 150 in FIG. 12 differs from the screen 150 in FIG. 11, because the page linked to the radio button "beef" has been accessed, not because of a response to the command. Thus, generally speaking, by embedding predefined choices in the expert agent's responses, the user's intentions can be easily and reliably confirmed.

In FIG. 12, the recipe agent 160 says, "How about these dishes?" and recipe titles 170 including "Fried beef with green peppers" are displayed. These choices reflect the results of the search already performed on the Internet 14 by the specific process execution unit 76 using the query criteria "Chinese dishes" AND "beef" AND "recipe", that correspond to the user's request. These titles have links through which the user can access Web pages describing the recipes in detail. In addition, other Web sites offering Chinese recipes are displayed in the research result field 172 for the user's convenience. In any case, the user can obtain the recipe details by starting from this screen 150. In this figure, the user enters another normal command "I would like to look at flight schedules" in the input field 154. The normal command is sent to the originating server 20, which identifies the travel agent on the travel server (that is not shown in the figure) and the necessary processes are initiated.

However, if the user inputs "I want to know about Egyptian palace dishes", the command may not be identified. In such a case, the system administrator is notified of the unidentified command as it is entered, and then the user command collection 38 and the index file 36 are updated. Additionally, a new page is provided on the recipe server to respond to the command, and thereby information regarding Egyptian palace dishes is properly returned.

Although the present invention has been described by way of exemplary embodiments, it should be understood that those skilled in the art might make numerous changes and substitutions without departing from the spirit and the scope of the present invention as defined by the appended claims. Some potential changes and substitutions are identified below.

Although the user command is entered in text format in the embodiment, it may also be entered using speech recognition. The agent may also respond verbally.

Although an unidentified command is defined as a command that is not contained in the user command collection 38, a command may also be considered unidentifiable if it is contained in the user command collection 38 but the expert agents response is not complete or fails to satisfy the user. For instance, when the specific process execution unit 76 searches for the user command "Recommend a recipe" and returns too many results to satisfy the user, the command may be reported to the system administrator as an unidentified command so that the expert agent's response can be improved.

In the embodiment, the expert agent's response is selected according to the record of the user's access to the specialized server. Moreover, an appropriate agent response may be selected based on the user's attributes. For instance, if the user is female, a relatively gentle expression may be chosen or if the user is an elder, a polite expression may be selected.

Although the local agent 152 and the chat agent 156 have the same image in the embodiment, it is not required. For instance, the local agent 152 may be implemented as a process initiating agent on the originating server 20 instead of the user terminal 12.

The second embodiment of the present invention is explained below. This embodiment relates to a translation technique, particularly one using a client-server system or other systems.

The prior art includes the well-known electronic dictionary in a form similar to an electronic calculator. The device displays an English word or other foreign words corresponding to a word entered by the user. Conventional printed dictionaries are very heavy, while portable dictionaries have very small characters. Both are generally inconvenient for traveling on business or holiday. However, the electronic dictionary is portable and suitable for traveling abroad, as well as saving space at home. Therefore it has been gaining popularity among specific users.

In addition to the electronic dictionary, a variety of computer software dictionaries are also on sale. Although their portability depends on the personal computer hardware, these programs made dictionaries easier to use. For this reason, users who write documents in a foreign language and professional translators use software dictionaries.

Such devices and software programs are designed for use in looking up words. The dictionary used in the device or software package was originally just an electronic version of a printed dictionary and was edited on a single word basis.

Apart from professional translators and users who already write and speak in a foreign language, general users find it very difficult to form individual words into a sentence when they look them up in a dictionary. In that sense, the current electronic dictionaries and software packages are not true communication tools, although this is understandable considering their purpose.

Figure 13:
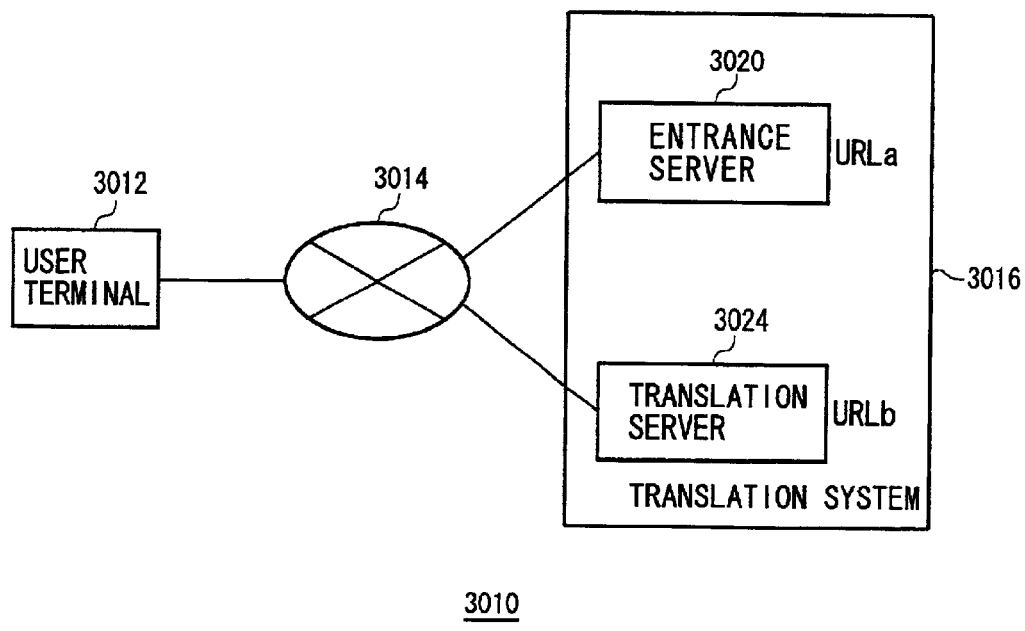
FIG. 13 is the overall structure of the network system including the translation system according to the second and the third embodiments.

FIG. 13 shows the overall structure of the network system 3010, including the translation system 3016, according to the second embodiment of the present invention. Here the user terminal 3012 and the translation system 3016 are connected to each other via the Internet 3014.

The translation system 3016 includes the entrance server 3020 and the translation server 3024, which may be configured as a single node within one site or as separate nodes. When the servers are configured separately, the processes can be distributed among them to balance or optimize loading. This also makes system maintenance easier. When the servers are configured as a single node, the total hardware resources requirement of the system can be reduced. Choosing which configuration to implement depends on the system design goals and system management policy.

In FIG. 13, URLa and URLb represent the network address of the entrance server 3020 and the translation server 3024 respectively. A user accesses the entrance server 3020 first in order to use the translation service. The entrance server 3020 receives a user command and identifies the command's contents. When the contents is identified, the entrance server 3020 transmits the address URLb of the translation server 3024 to the user terminal 3012 and the user terminal 3012 accesses the translation server 3024. The translation server 3024 translates the contents of the command and sends the translated contents back to the user. The translation server 3024 then receives the next command from the user and sends it to the entrance server 3020. At this time, the translation server 3024 transmits the address URLa of the entrance server 3020 to the user terminal 3012 so that the user accesses the entrance server 3020 again. This process is repeated between the entrance server 3020 and the translation server 3024.

Figure 14:
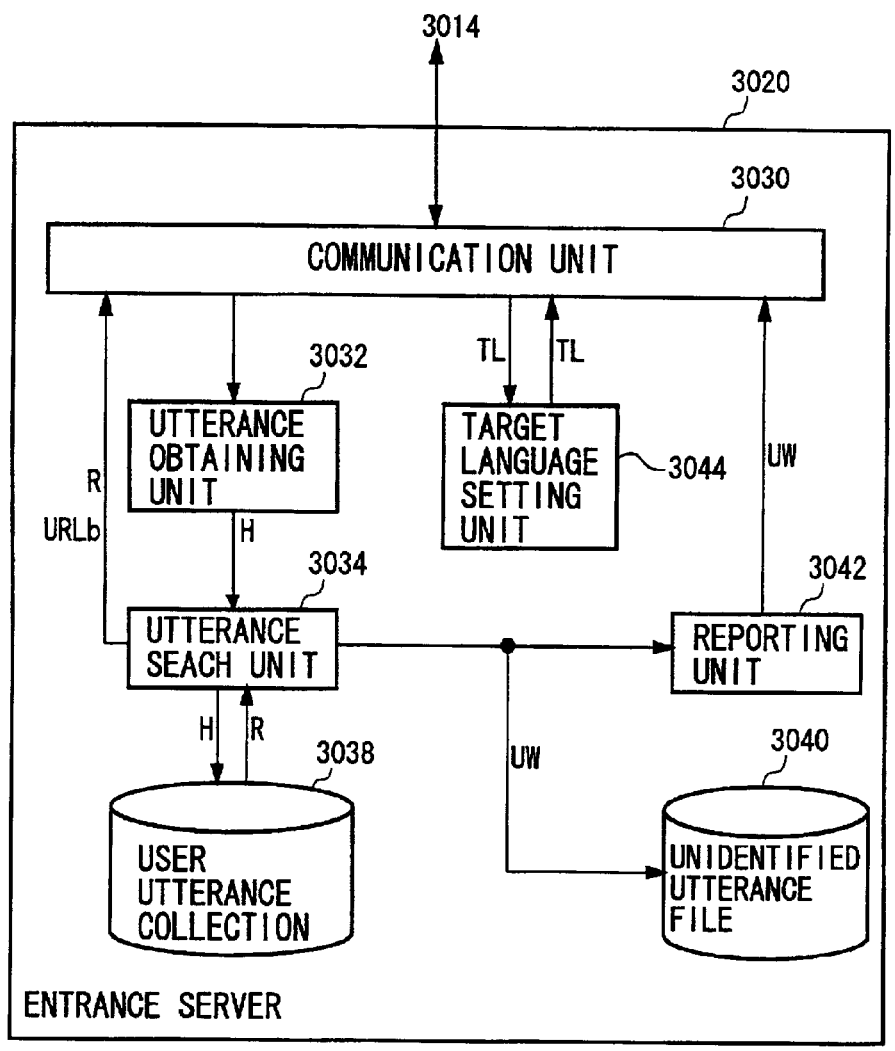
FIG. 14 is the internal structure of the entrance server represented by the first block of the second embodiment.

FIG. 14 shows the internal structure of the entrance server 3020. The entrance server 3020 is an Internet service site such as a Web server or the like. In this case, the entrance server 3020 can have multiple configurations, including leaving the main functions on the server side like a Common Gateway Interface (CGI) implementation, transferring the main functions to the client side like a Java™ applet or ActiveX™ implementation, or an Application Program Interface type implementation providing the main functions on both the server and the client sides. Both the translation server 3024 and the entrance server 3020 can be configured in any of these ways. In FIG. 14, "H" indicates a command, "L" indicates the target language for translation, "R" indicates a database record, and "UW" indicates an unidentified command (a command whose contents cannot be identified.)

The entrance server's 3020 communication unit 3030 communicates with the user terminal 3012 and the translation server via the Internet 3014. The command obtaining unit 3032 obtains the command entered by the user and sends it to the command search unit 3034. The command search unit 3034 looks up the command in the user command collection 3038 and identifies its contents. This identification is achieved by finding a sentence corresponding to the whole user command. The identified command is then sent to the translation server 3024 in the form of record number R, and the corresponding record in the dictionary file in the translation server 3024 is retrieved. After identifying the command, the command search unit 3034 transmits the address URLb of the translation server 3024 to the user terminal 3012.

When a sentence corresponding exactly to the user's command is not stored in the user command collection 3038, a process similar to that in the first embodiment is executed. Only the differences between the processes are described below. The commands for which a second search is conducted unsuccessfully are recorded as unidentified commands in the unidentified command file 3040. The translation system 3016 administrator is then notified of this via the reporting unit 3042 by electronic mail or similar process. The administrator enters both a new registration for the unidentified command and a corresponding expression in the user command collection 3038 and dictionary file.

The target language setting unit 3044 obtains the target language, the translation language specified by the user, and passes it to the translation server 3024. Using this input, the translation server 3024 performs the translation in the language that the user selected from the many languages supported.

FIG. 15 represents the internal structure of the user command collection 3038. The user command collection 3038 has a first character column 3050, a user command column 3052, and a record column 3054. The Japanese syllabary is written in the first character column 3050 and anticipated user commands are arranged in the order of the Japanese syllabary in the user command column 3052. The user command may be a single word such as "Asa", or the equivalent of a conversational sentence. The record column 3054 has a record number R that corresponds to the dictionary file on the translation server 3024, and serves as an index for referring to the dictionary. For example, in the figure the index of the user command "Arigato" is R112.

Figure 16:
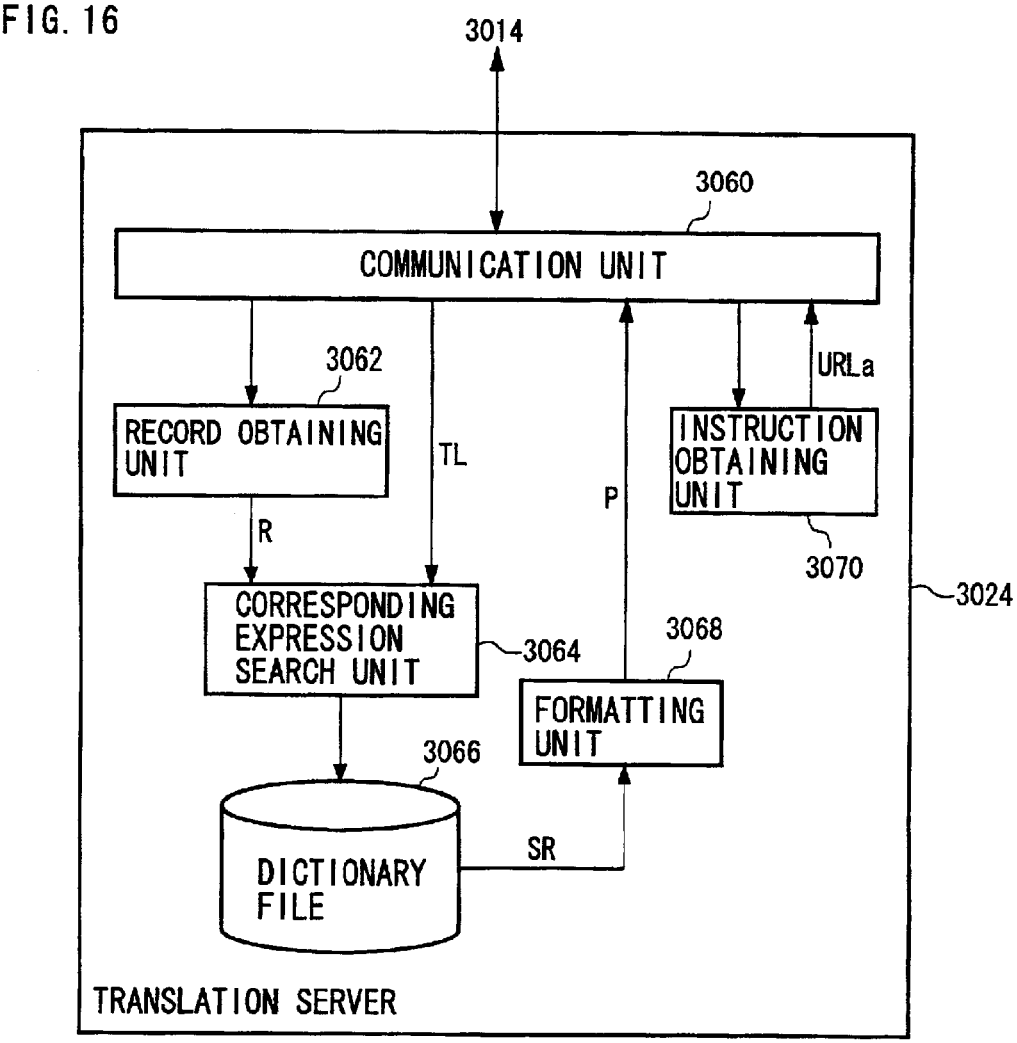
FIG. 16 is the internal structure of the translation server represented by the second block of the second and the third embodiments.

FIG. 16 represents the internal structure of the translation server 3024. The communication unit 3060 communicates with the user terminal 3012 and the originating server 3020 via the Internet 3014. The record number R identified in the command search unit 3034 of the entrance server 3020 is received by the record obtaining unit 3062 via the communication unit 3060 and passed to a corresponding expression search unit 3064. Further, the target language obtained by the target language setting unit 3044 of the entrance server 3020 is also passed to the corresponding expression search unit 3064. The corresponding expression search unit 3064 retrieves the corresponding expression, as indicated by SR in the figure, from the dictionary file 3066 based on the information given and passes it to the formatting unit 3068. The formatting unit 3068 converts the corresponding expression into a Web page or an electronic mail message, as indicated by P in the figure, and sends it to the user terminal 3012 via the communication unit 3060. The instruction obtaining unit 3070 obtains the next user command and sends it to the entrance server 3020, receives the user's choice if multiple corresponding expressions exist, or receives the user's instruction to paste the corresponding expression into a document or an electronic mail message being edited. The instruction obtaining unit 3070 may also performs any other desired processes. The instruction obtaining unit 3070 finally causes the user terminal 3012 to access the entrance server 3020, at URLa, in order to identify the next command.

FIG. 17 represents the data structure of the dictionary file 3066. The dictionary file 3066 has a record column 3054, an English column 3080, a French column 3082, and other language columns not shown in the figure. Two choices each are given for the English and French translations of the user command "Arigato", which is record number R112. For instance, "Thank you" is the normal expression and "Thank you very much" is the polite expression for the English translation, allowing the user to choose depending on the situation.

Figure 18:
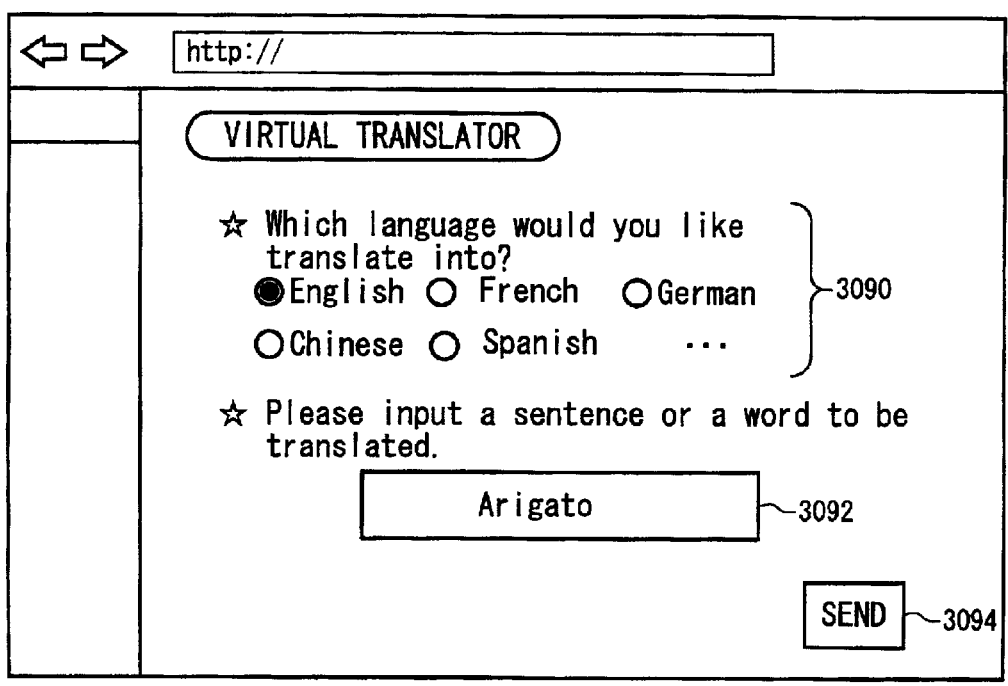
FIG. 18 shows the screen displayed when the user accesses an entrance server to use the translation service.

The flow of the translation service is as follows. FIG. 18 shows the screen displayed when a user accesses the entrance server 3020 to use the translation service. A field 3090 is displayed under the service title "VIRTUAL TRANSLATOR", allowing the user to specify the translation language. English is selected in this example. An input field 3092 is provided beneath the translation language field 3090 along with the statement "Please input a sentence or word to be translated." The user enters "Arigato" and presses the send button 3094. The entrance server 3020 executes a series of processes initiated by the user's action, and the target language, English, and record number, R112, are sent to the translation server 3024. At the same time, the user terminal's 3012 access destination changes to the translation server 3024.

Figure 19:
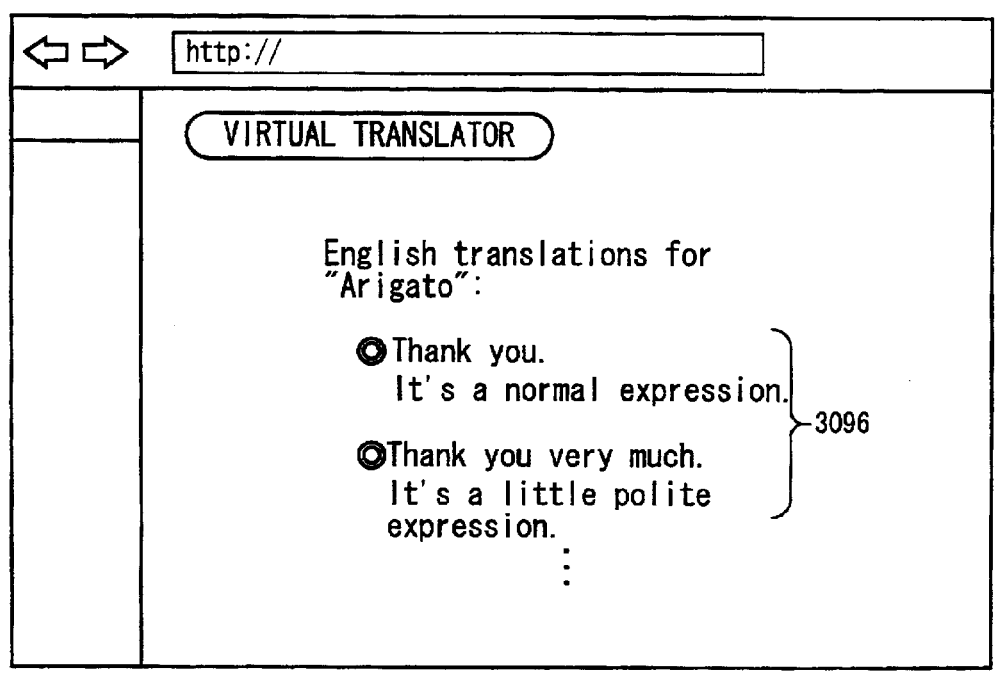
FIG. 19 shows the screen displayed when a user accesses the translation server.

FIG. 19 shows the screen displayed when the user accesses the translation server 3024. The translation server 3024 identifies the records for expressions corresponding to "Arigato" based on the record number R112 and provides the desired translations based on the target language "English" sent from the entrance server 3020. Two translations 3096 corresponding to "Arigato" are shown with simple explanations. If the user selects one of these translations by clicking it, various processes can be performed by the instruction obtaining unit 3070 in the translation server 3024, such as pasting the translation into an electronic mail message that is being edited.

Figure 20:
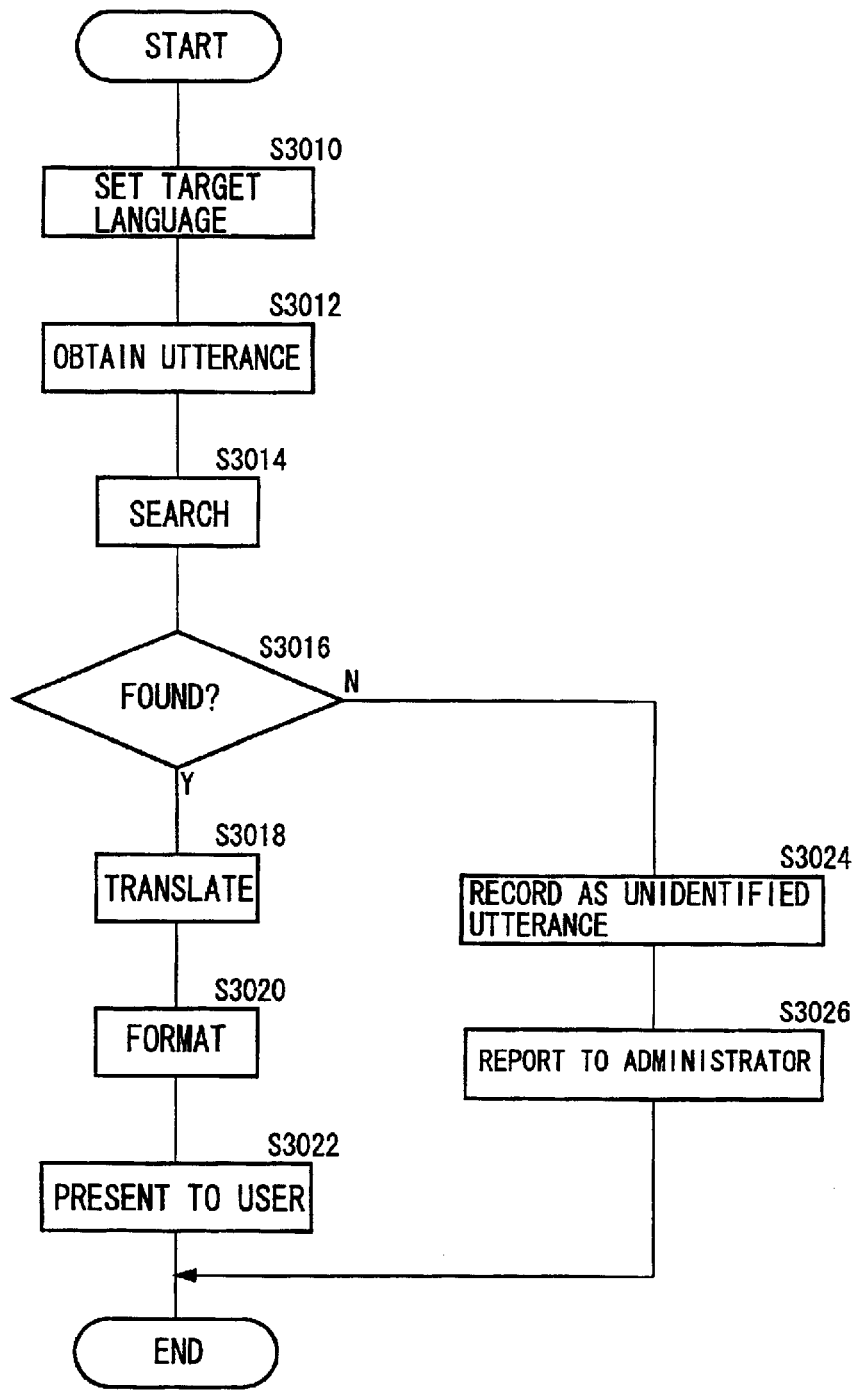
FIG. 20 is a flow chart showing the translation procedure according to the second embodiment.

The flow chart in FIG. 20 depicts the processes mentioned above. The user sets a target language (S3010) to begin the process. The command obtaining unit 3032 then obtains a user command (S3012) and the command search unit 3034 searches for that command (S3014). If the user's command is found in the user command collection 3038 (Y of S3016), the translation server 3024 translates it (S3018), formats it (S3020), and then relays it to the user terminal 3012 (S3022). Conversely, if the user command is not found in the user command collection 3038, and its contents cannot be identified even by a morpheme analysis (N of S3016), the command is recorded in the unidentified command file 3040 (S3024) and the system administrator is notified (S3026). As mentioned above, the translation system comprising the second embodiment can produce translations that satisfy the user's requirements, while maintaining a high level of responsiveness and improving the ease of maintenance.

Figure 21:
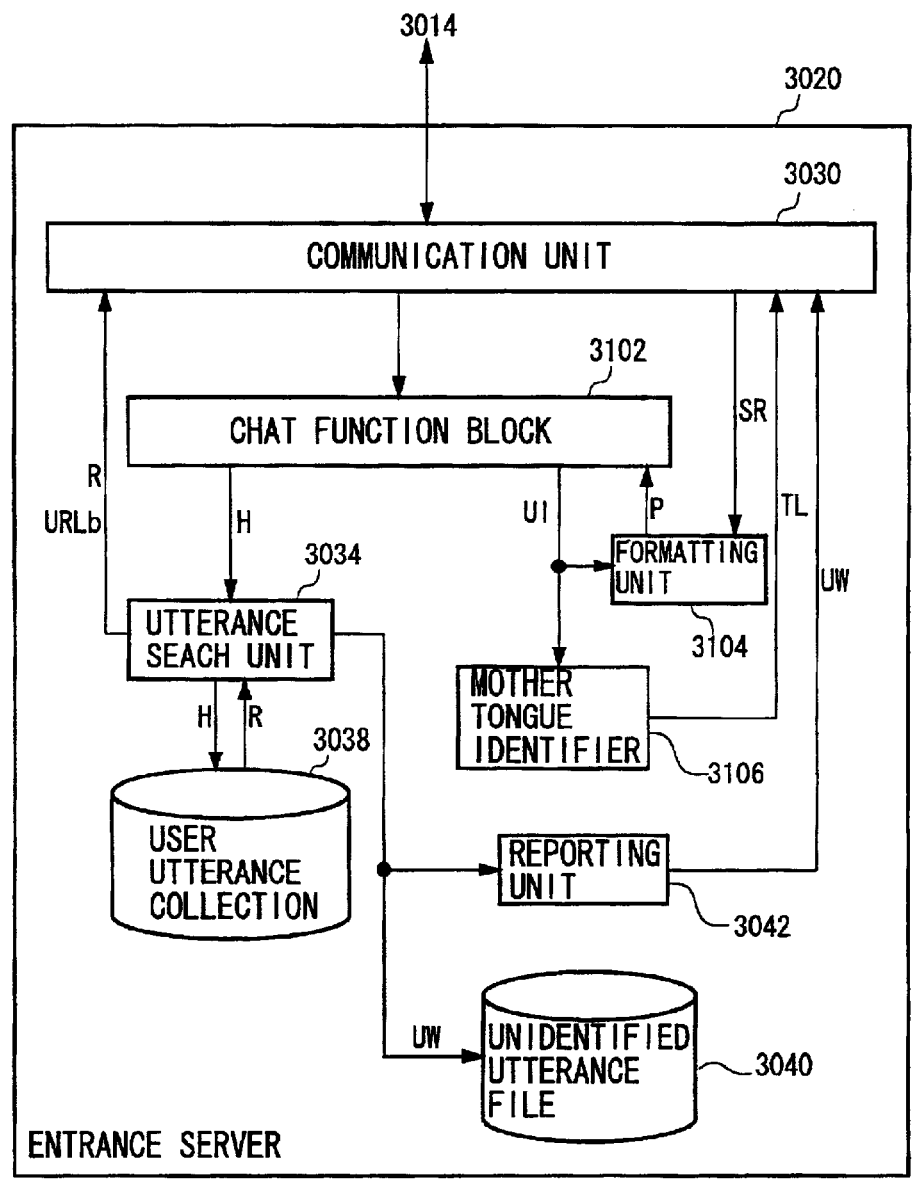
FIG. 21 is the internal structure of the entrance server according to the third embodiment.

The third embodiment of the present invention is explained below. The translation system structure in the present invention can be applied to other types of applications that users are involved in. FIG. 21 shows the entrance server 3020 for a chat room where users from many countries assemble. In the figure, the numbers assigned to the components are equivalent to those in FIG. 14 and the explanations are omitted where appropriate.

The chat function block 3102 provides functions to realize a general conventional chat room, such as registering a user's handle or nickname, allowing users to enter a room, administration of users who have entered a room, obtaining users' chat, and broadcasting the chat. The chat function block 3102 has a user attribute obtaining unit that is not shown in the block. That unit obtains information specifying the user's native language, referred to as native language information, as well as typical user information. The native language information may be entered by the user or detected from the language used to display Web pages on the user's terminal 3012. The native language may also be determined using terminal information, such as the operating system (OS) installed on the user's terminal 3012. The attribute information, especially the user's native language, is indicated by "UI" in the figure. The UI for each user, referred to as a member, who has entered the chat room, is transmitted to the native language identifier 3106. The native language identifier 3106 identifies all target languages, indicated by "TL", based on the native languages of the members and transmits them to the translation server 3024.

The chat function block 3102 obtains the input "H" of each member and sends it to the command search unit 3034. Therefore, the function of the command obtaining unit 3032 in the second embodiment is realized inside of the chat function block 3102. When the command search unit 3034 identifies a record number "R", it is sent to the translation server 3024. The formatting unit 3104 then receives the translation result from the translation server 3024 and selects the corresponding expression in the native language of each member by referring to the member's attribute information "UI". It then formats a display page and returns it to the chat function block 3102. The chat function block 3102 generates different pages based on the members' native languages and broadcasts them to the members simultaneously.

The translation server 3024 in this embodiment is essentially equivalent to the translation server in the second embodiment, but the formatting unit 3104 is provided in the entrance server 3020 in this embodiment, as shown in FIG. 21. Therefore the translation server 3024 does not have the formatting unit 3068 and must send the translation results obtained from the dictionary file 3066 to the formatting unit 3104 of the entrance server 3020.

Figure 22:
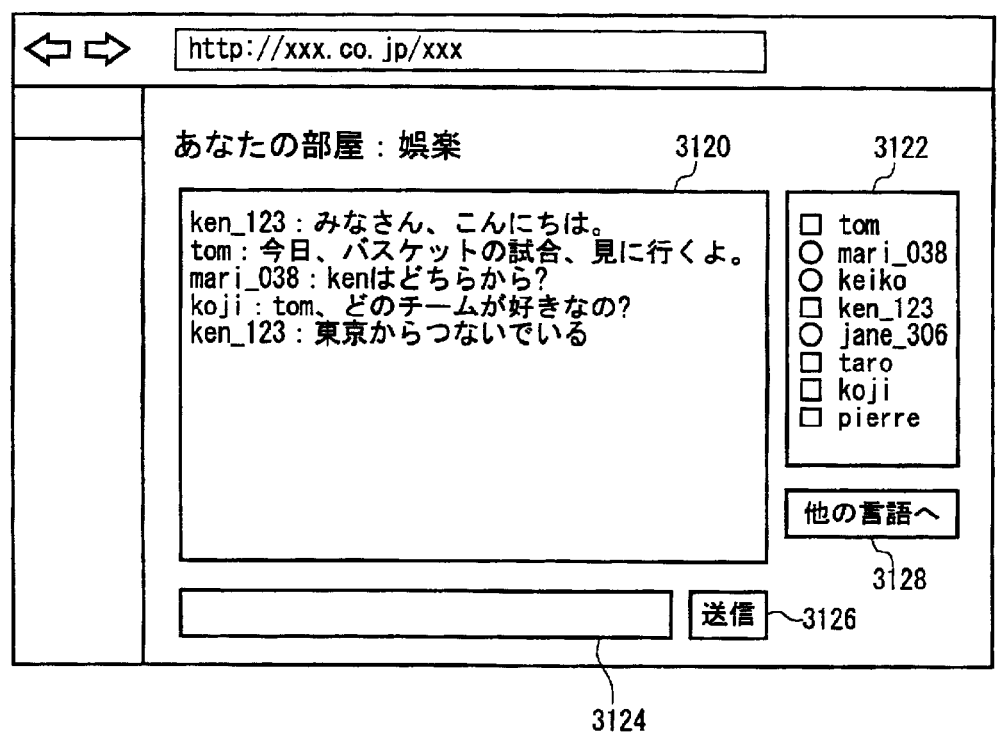
FIG. 22 illustrates a Japanese version of the screen of a multilingual chat service according to the third embodiment.

FIG. 22 illustrates a chat room in which members of different nationalities are participating. The members' names, such as "Tom", are displayed in the member field 3122 and their conversation threads are shown in the main field 3120. The field 3124 allowing a member to enter a conversation thread and click the submit button 3126 to send the thread are provided at the bottom. In addition, an "other languages" button 3128 is also provided.

Several members, including ken_123, are presently chatting with each other in the main field 3120. The chat is displayed in Japanese and it appears that all members are Japanese. However, while "Taro" is Japanese, "Tom" is American, "Pierre" is French, and the other members are either Japanese, American or French. The screen in FIG. 22 is being displayed on "Taro's" user terminal 3012.

In this situation, the native language identifier 3106 identifies "Japanese, English, and French" as the target languages. If a member's input is Japanese, the content is identified by the command search unit 3034 in the entrance server 3020 and the record number R is sent to the translation server 3024. The corresponding expression search unit 3064 in the translation server 3024 identifies the English and French expressions for the Japanese input based on the record number R and the target languages "Japanese, English, and French". The expressions are then sent to the formatting unit 3104 in the entrance server 3020. The formatting unit 3104 transmits the page data for the screen in FIG. 22 to Japanese members such as "Taro" using the native language information of each member.

Figure 23:
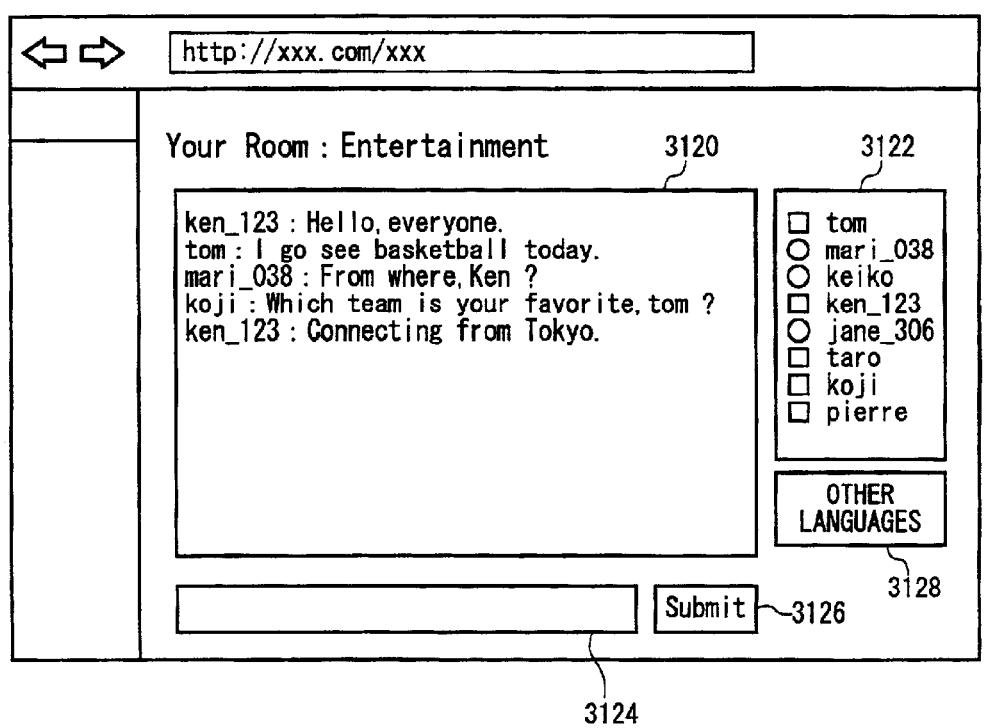
FIG. 23 illustrates an English version of the screen of a multilingual chat service according to the third embodiment.

Alternatively, the formatting unit 3104 transmits the page data for the screen in FIG. 23 to the American members such as "Tom". The screen in FIG. 23 is an English version of the screen in FIG. 22, and to member "Tom" it appears that all members are speaking English. Likewise, it appears to member "Pierre" that all members are speaking French, although that screen is not shown.

The "other languages" button 3128 is provided on the screen as shown in FIG. 22 and FIG. 23. It is used when the members want to change the screen to a language other than their native language. For instance, when the member "Taro" presses the button in FIG. 22, an English screen like FIG. 23 is offered.

Some modifications to this embodiment are discussed below. In the second and third embodiments the user input is entered in text, but it may also be entered using speech recognition. With that modification, the present invention may be utilized as an interpretation tool.

Although an unidentified command is defined as a command that cannot be located in the user command collection 3038, the definition may be expanded to include a command that is included in the user command collection 3038 but for which the translation is not complete or not satisfactory. Those cases are also reported to the system administrator so that the dictionary file 3066 can be revised.

Several choices may be found during translation, as in FIG. 19, so the formatting unit 3068 and other units may select an appropriate expression based on the user's attributes. For instance, a relatively gentle expression may be chosen if the user is female, or a polite expression may be selected for an elder.

Moreover, the system may be configured to allow users to specify a tone in translation. For example, users may specify "very politely" or "friendly", and the formatting unit 3068 and other units will select the appropriate expression.

Although the user command collection 3038 in the embodiments is configured on the assumption that the first user command will be made in Japanese, the user command collection may be generated for any other language as well. The appropriate language version of the user command collection can be determined once the user's native language is defined.

The translation system described in the embodiments can be integrated into a user support apparatus or system. Such an apparatus or system may contain an agent to respond to a user's questions, and if the agent cannot understand the question, the translation process in the embodiments can be used. A collection of the agent's response patterns may also be created for various languages, so that the agent can respond to users who speak different languages. Extending the system to support multiple languages will not be difficult. Only the agent's responses will need to be produced in multiple languages, since other data such as action patterns and images can be shared universally.

Although the translation example in the embodiments is made between different languages, the present invention can also be applied to translation between dialects, translation from archaic to modern expression, or facilitating discussions between different generations.

Moreover, the present invention can be applied to a real time translation service for telephone conversations in different languages or discussions at international conferences.

Figure 24:
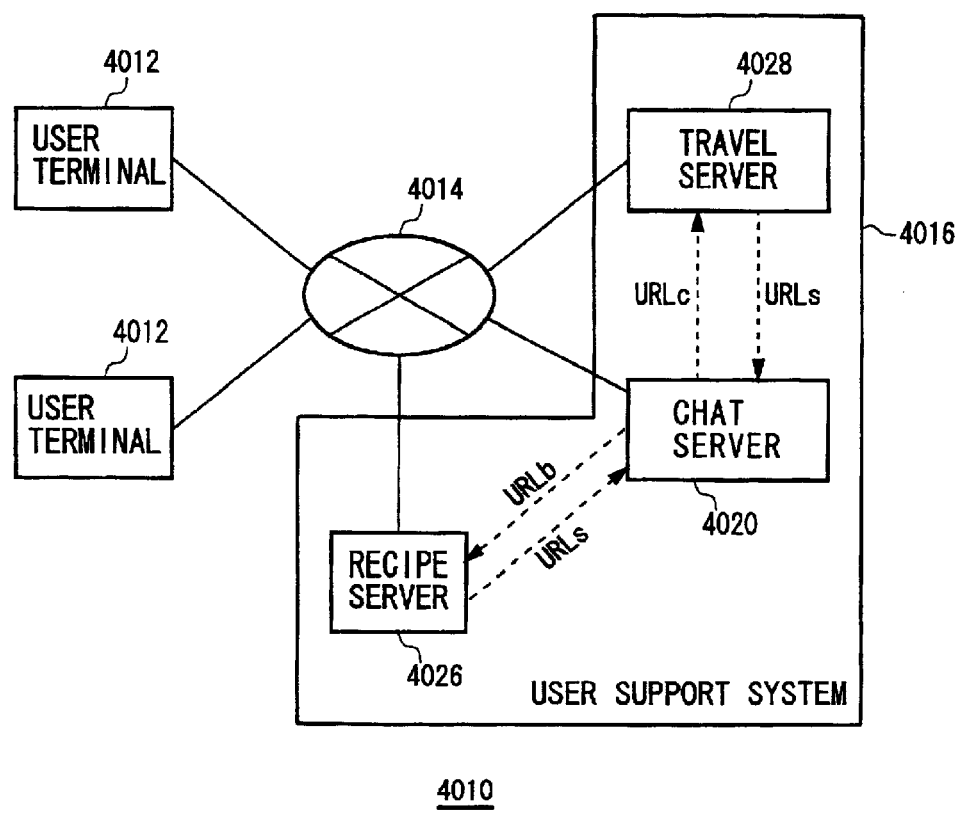
FIG. 24 is the overall structure of the network system including the user support system according to the fourth embodiment.

FIG. 24 shows the overall structure of the network system 4010, including a user support system 4016, for the fourth embodiment of the present invention.

The user support system 4016 includes the chat server 4020, the recipe server 4026, and the travel server 4028, each of which is connected to the Internet 4014. Thus, the chat server 4020, the recipe server 4026, and the travel server 4028 are configured as separate network nodes, and each of these servers processes the user commands and agent responses with respect to their specialized field. For instance, the chat server 4020 processes general greetings such as "Hello", the recipe server 4026 processes commands regarding cooking such as "Recommend a recipe", and the travel server 4028 processes commands concerning travel such as "Recommend a domestic travel destination".

In this embodiment, the user contacts the chat server 4020 first, upon initially accessing the user support system 4016, and the chat server 4020 processes the initial user command. In this sense, the chat server 4020 is also referred to as "an originating server". In the following, servers such as the chat server 4020, the recipe server 4026, and the travel server 4028 are generally referred to as specialized servers, and agents implemented on these servers are referred to as expert agents.

Each specialized server includes a first block that has an electronic collection of user commands and identifies the contents of a given user command, and a second block that has an electronic collection of action patterns for the agent's use in responding to user commands. The user command collection includes a general command library that stores general user commands and a specialized command library that stores commands related to the expert agents specialized field. The specialized server identifies the general user commands and the commands related to its specialized field, enabling the expert agent to respond to users.

The user command collection of the originating server 4020 stores the specialized command libraries of all specialized servers in the user support system 4016. The originating server 4020 receives all of the commands that any of the other specialized servers cannot identify and locates the specialized server that can process the command by matching it with the user command collection. When a specialized server that can process the command is found, the process is taken over by that specialized server and the specialized server continues to process the user commands as long as the user talks about the specialized field.

Since the abstract of the process in FIG. 24 is almost identical to that in the first embodiment, only the differences are explained here.

When the user inputs a new normal command to the expert agent, the command is captured and checked in the user command collection on the specialized server. When the contents of the command is identified, the specialized server sends the URL for another page on that server to the user terminal's 4012 Web browser, and concurrently retrieves an agent action from the agent action collection to perform the response process. As long as the user's normal command is identifiable at the specialized server, the specialized server repeats the sequence of processes; obtaining the user's command, responding to the user through the expert agent, and requesting or prompting the user for another normal command.

When the contents of the command cannot be identified, the command is sent to the originating server 4020, as denoted by URLs. The originating server 4020 then identifies a specialized server to respond to the command by matching it with the user command collection and sends the URL for that specialized server to the user terminal 4012. The subsequent process is thereby transferred to the specialized server and the second block of the specialized server performs the subsequent response processes. A command that cannot be identified by the originating server 4020 is reported to the system administrator as described below.

Thus, each specialized server converses with the user on the topic in its specialized field. Although the originating server converses with the user on topics related to chat, it also functions to identify user commands on topics related to the specialized fields handled by other specialized servers and provides the user terminal 4012 with the address of the appropriate specialized server.

The advantage of this configuration is that a third party can independently develop a server for their specialized field. The specialized server's administrator gets the general command library from the system administrator and develops a unique specialized command library and agent action library. This promotes the development of servers for specialized fields and allows a system that covers many specialized fields to be developed in a relatively short time. The general command library may be provided to each specialized server as packaged software or a library site offering the general command library may be provided with specialized server administrators receiving access rights. Using a library site eliminates the effort required to provide the latest software package to the specialized servers whenever the general command library is updated.

Figure 25:
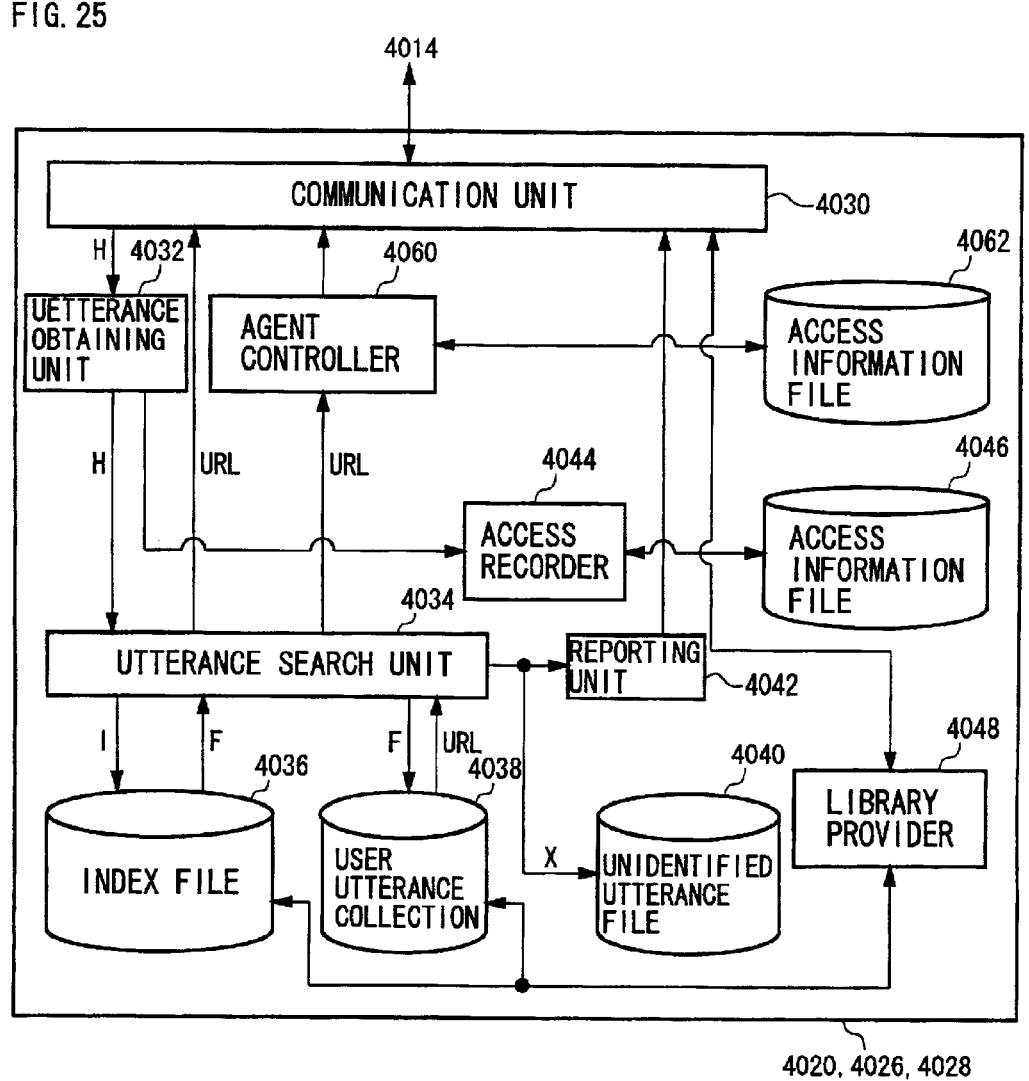
FIG. 25 is the internal structure of the originating server in the user support system.

FIG. 25 shows the originating server's 4020 internal structure. The originating server 4020 in this embodiment has functions similar to those in the first embodiment. Only the functional differences will be explained.

When a command is identified using the index file 4036, a file descriptor for the file containing information such as the URL of the specialized server that should respond to the command is identified in the index file 4036. The file built into the user command collection 4038 is then opened and the URL is retrieved.

If the URL retrieved from the user command collection 4038 points to the specialized server, the URL is forwarded to the agent controller 4060. The agent controller 4060 then forwards the URL to the user terminal's 4012 browser via the communication unit 4030 and retrieves the agent action that corresponds to the URL from the agent action collection 4062. Finally, the agent controller 4060 performs the required agent action.

If the URL points to a different specialized server, the URL is forwarded to the browser on the user terminal 4012 via the communication unit 4030 and the user terminal 4012 in turn accesses the specialized server.

When a statement corresponding exactly to the user's input has not been previously stored in the user command collection 4038, a procedure similar to that in the first embodiment is executed. Only the procedural differences are described below.

When the system administrator is notified of an unidentified command, he/she reports the contents of the command to the specialized server's administrator so they can respond to the command and develop a response process for the specialized server's expert agent. The specialized server's administrator registers the unidentified command and the URL of the page on the specialized server used to respond to the command. Both items are stored in the user command collection 4038 of the specialized server and the command's index is registered in the index file 4036. Lastly, the specialized server's administrator designs processes, including the expert agent's responses, on the response page. After development is complete, the specialized server's administrator notifies the originating server 4020 of the newly developed response, its index, and the URL of the page on the specialized server that contains the response. The administrator of the originating server 4020 then registers the contents in the index file 4036 and the user command collection 4038.

Figure 26:
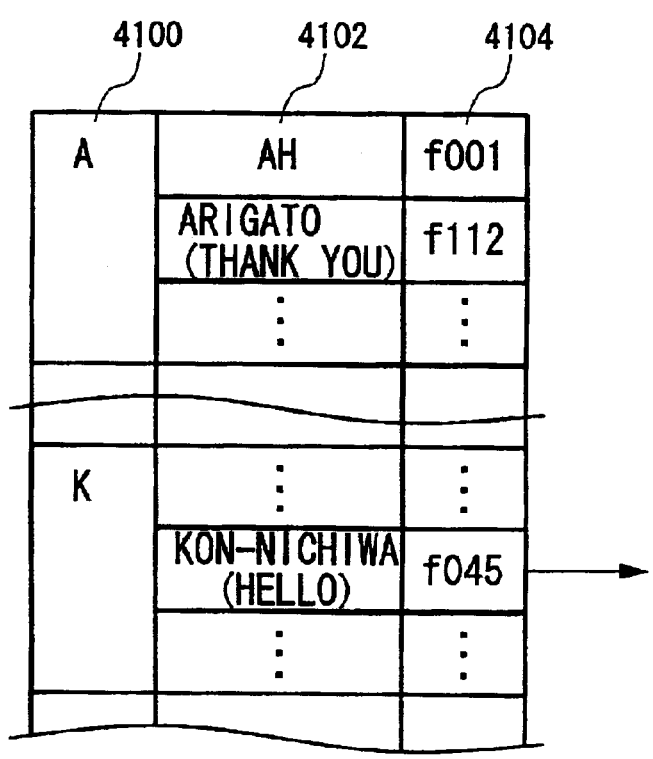
FIG. 26 is the internal structure of the index file in the originating server.
Figure 27:
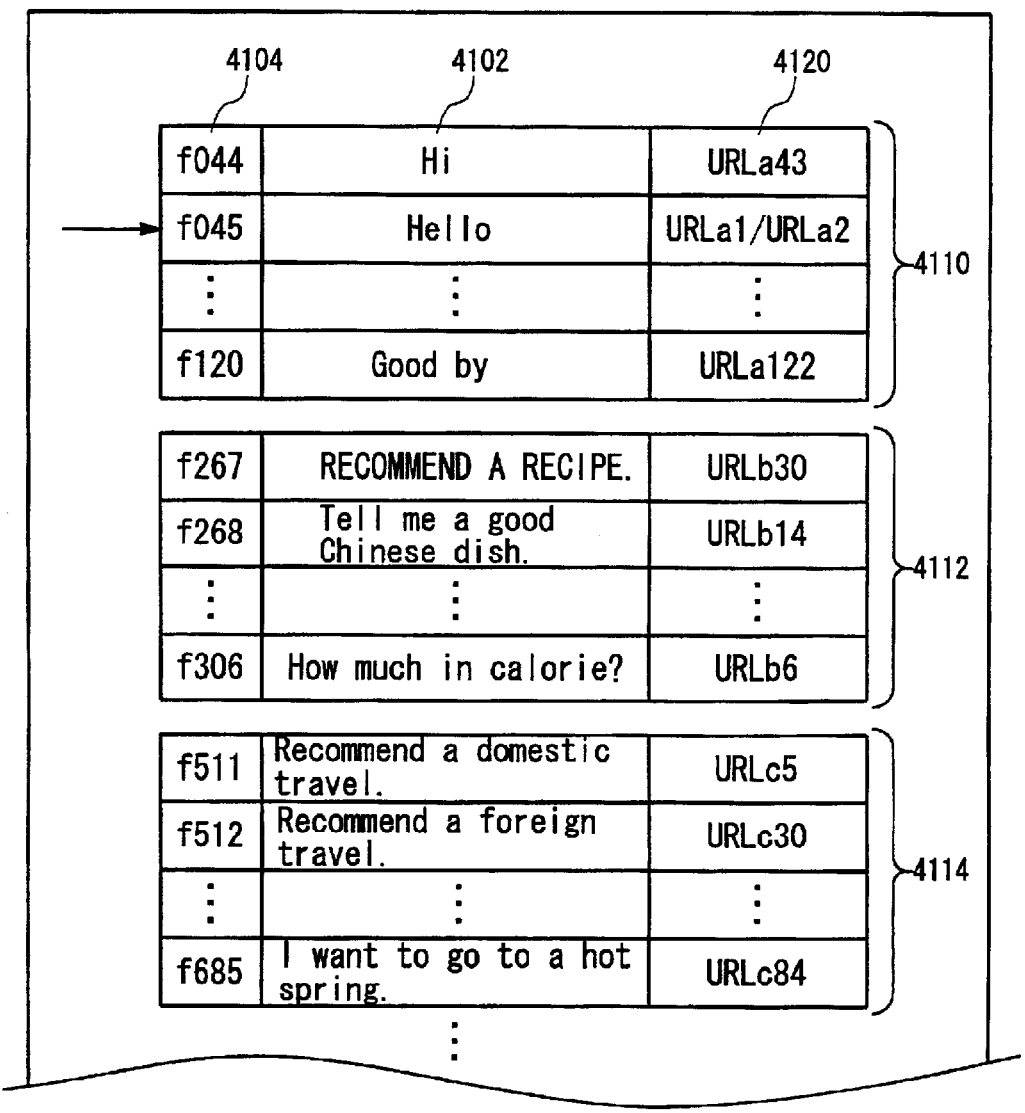
FIG. 27 is the internal structure of the user command collection in the originating server.

FIG. 26 represents the internal structure of the index file 4036 and FIG. 27 represents the internal structure of the user command collection 4038. The index file 4036 structure is the same as that in the first embodiment, but two separate index files may be provided, one for the general command library and one for the specialized command library. A single index file containing both libraries may also be used however. The user command collection 4038 structure is identical to that in the first embodiment, but the user commands 4114 associated with the travel server 4028 have been added to the collection.

FIG. 28 illustrates the internal description of the access information file 4046. As in the first embodiment, when "user2" visits the chat server 4020, the chat agent begins with a greeting prepared for first-time visitors. When "user1" visits the chat server 4020, the chat agent produces a greeting prepared for returning visitors.

Figure 29:
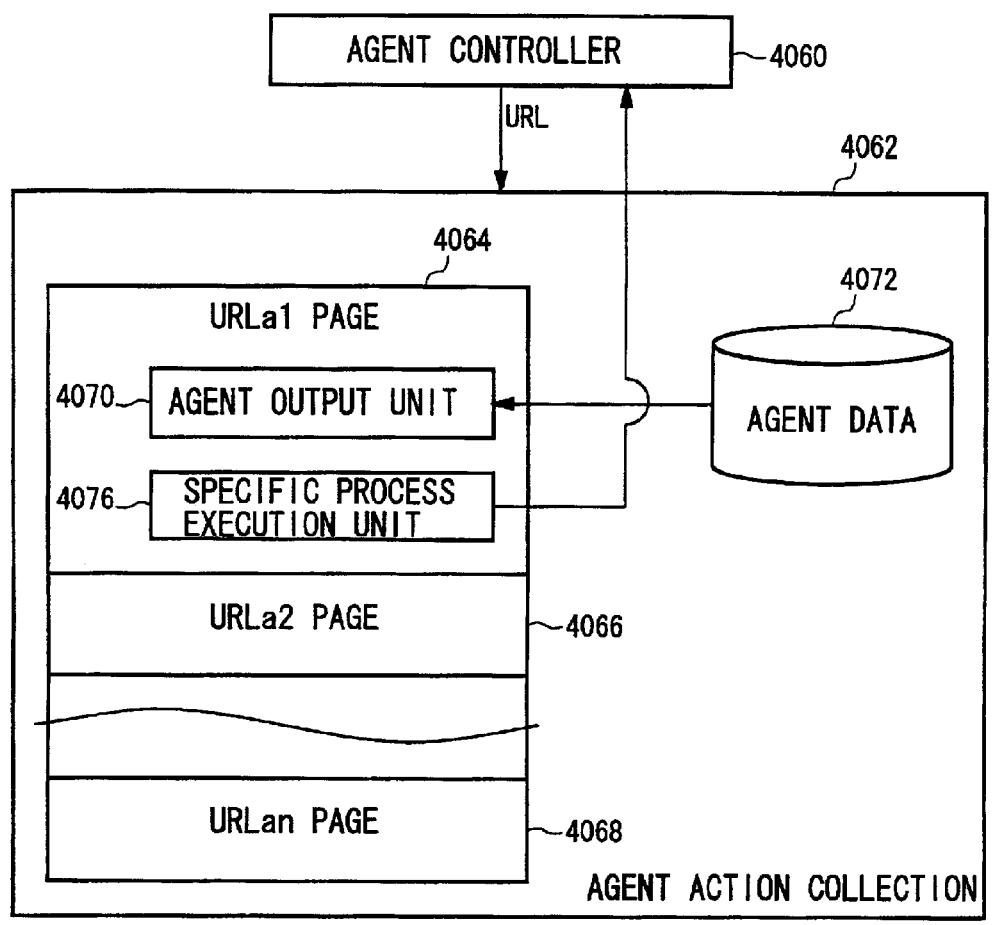
FIG. 29 is the internal structure of the agent action collection in the originating server.

FIG. 29 represents the internal structure of the agent action collection 4062. The URL identified in the originating server's 4020 command search unit 4034, for instance URLa1 or URLa2 corresponding to the greeting "Hello" as in FIG. 27, is forwarded to the agent behavior collection 4062 via the agent controller 4060. The agent action collection's 4062 structure is identical to that in the first embodiment, except it does not contain the user command obtaining unit 4074.

The library provider 4048 manages the general command library and provides it to the other specialized server administrators, either off-line or online. For instance, the general command library can be provided off-line as a software package or online by offering an access right for each server that stores the library. In this embodiment, when the library provider 4048 receives a request from any specialized server, it retrieves the general library from the user command collection 4038 and transmits it to the specialized server via the communication unit 4030. The library provider 4048 may also send and receive a specialized command library. For instance, when any other specialized server develops a new specialized command library, the library provider 4048 may receive that specialized command library and register it in both the index file 4036 and the user command collection 4038. Thereby the maintenance of the user support system as a whole becomes easier.

The structure and behavior of the specialized servers, other than the originating server 4020, are explained below. The recipe server 4026 is explained here to serve as an example, since the other specialized servers function in the same manner. The internal structure of the recipe server 4026 is almost identical to that of the originating server 4020 in FIG. 25. Therefore, the process sequence explained here focuses primarily on the functions that differ from those of the originating server 4020.

First, when the recipe server 4026 is determined to be capable of processing the user command obtained at the originating server 4020, the URL for the appropriate page within the recipe server 4026 is sent to the user terminal's 4012 browser. The browser then accesses the recipe server 4026 and requests that the agent controller 4060 retrieve the corresponding page via the communication unit 4030. The agent controller 4060 retrieves the corresponding page from the agent action collection 4062 and transmits that page to the users browser, then executes other necessary processes.

Subsequently, the recipe server 4026 waits for the user to enter the next command. When the user enters the command, the command obtaining unit 4032 obtains the command and the command search unit 4034 identifies it, following the same process the originating server 4020 uses. The recipe server 4026 has a general command library and a specialized command library related to cooking, and can identify the user's general commands and cooking-related commands, but cannot identify any other specialized commands. If the command search unit 4034 can identify the user's command, the agent controller 4060 executes the response processes. If the user command cannot be identified, the command is recorded as an unidentified command in the unidentified command file 4040, and the reporting unit 4042 sends the command to the originating server 4020. The originating server 4020 then matches the command with its user command collection 4038 and the specialized server that should process the command is identified. Then that specialized server executes the subsequent process. When the recipe server's 4026 administrator finds a cooking-related command among the unidentified commands recorded in the unidentified command file 4040, he/she develops the response process for that command and registers it in the recipe server 4026. This allows the agent processes to be easily enhanced. In this embodiment, the unidentified commands are recorded in the unidentified command file 4040 of each specialized server and the originating server 4020. It is also possible to record them only in either the specialized servers or the originating server 4020.

The library provider 4048 accesses the library site that contains the general command library at a predefined interval, obtains the most recent general command library, and registers it with the index file 4036 and the user command collection 4038. The library provider 4048 also sends the recipe server's 4026 newly developed specialized command library to the originating server 4020. Thus each specialized server is independently maintained, enhancing the user support system as a whole.

The internal structure of the user terminal 4012 for this embodiment is the same as that of the first embodiment. The screen displayed on the user terminal 4012 is also the same as that demonstrated in the first embodiment However, in FIG. 12, when the user entered the normal command "I would like to look at flight schedules" and sent it to the recipe server 4026, the recipe server 4026 could not identify it in its user command collection 4038 and therefor sent it to the originating server 4020 as an unidentified command. The originating server 4020 then identified the travel server 4028 that could process the command by matching it with the travel server's 4028 user command collection. The travel server 4028 then initiated the subsequent processes.

Modifications to the preceding process are stated below. Although the chat server 4020 functions as the originating server in this embodiment, any other specialized server could have been used for that purpose or multiple originating servers could have been used. Instead of using a specialized server as an originating server, a dedicated originating server might have been used apart from the specialized servers. Moreover, instead of employing an originating server, a command that cannot be identified at one specialized server may be circulated among the other specialized servers to determine which of them can process it.

Although the originating server 4020 identifies the user command and sets the URL for the specialized server's page to respond to the command in this embodiment, the originating server 4020 may simply identify the specialized server that will process the user command and allow the specialized server to identify the contents of the command and set the URL of the corresponding page to respond to the user terminal. This process would reduce the load on the originating server 4020.

The fifth embodiment of the present invention is explained below. Since Internet access from the home has recently become common, the number of World Wide Web (WWW) users has grown rapidly. This number has increased further because of the convenience of accessing huge amounts of information from all over the world. But, while it is very likely that the information users want exists somewhere within the ever expanding Internet, the number of Web sites or pages has become too large for users to find that information.

System administrators of portal sites with search engines are aware of this problem and have been trying hard to make their search methods more sophisticated. The use of directory trees, is an example of the improved search methodologies. With a directory tree search, users can efficiently separate the information they want from the existing flood of material by defining search conditions such as logical OR and logical AND within a specific topic or category already defined by the portal sites.

However, it is extremely difficult for general users to employ these highly complicated search conditions, since most of them are new to computing. Additionally, the information available on the Web has a complicated hierarchy and sometimes it is difficult for users to find the information they want in that hierarchy. The information surplus may destroy its utility as both the number of beginners joining the Web and the number of Web sites continue to increase.

Figure 30:
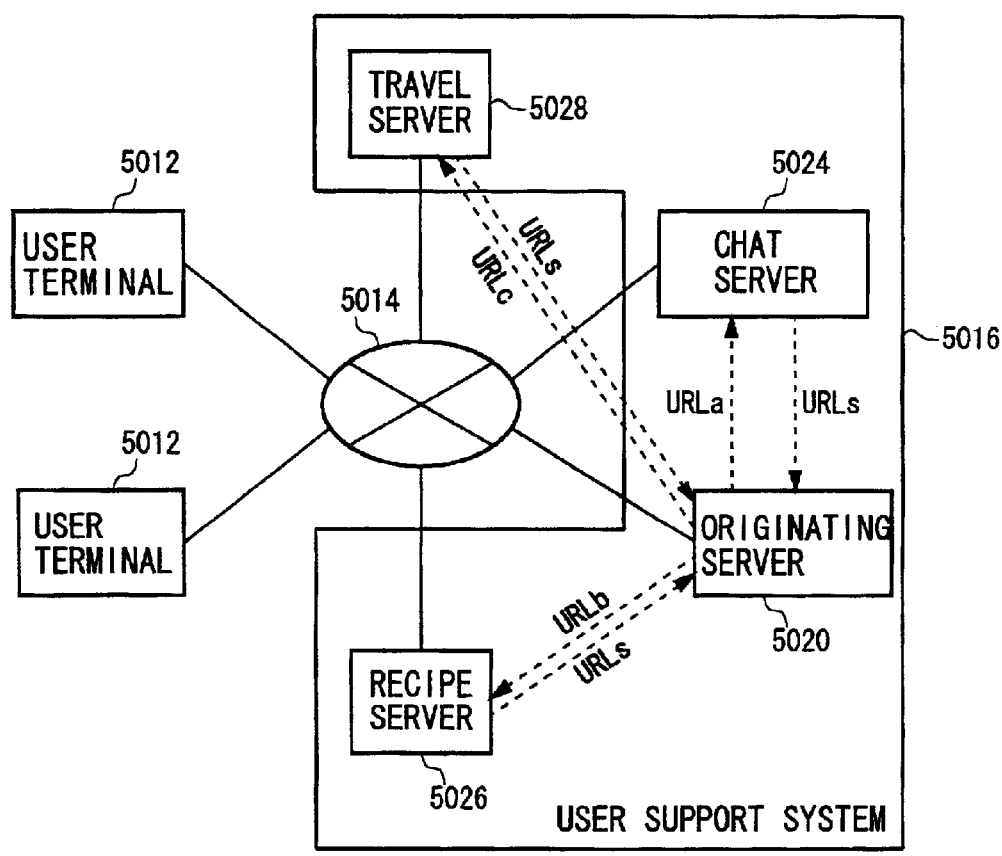
FIG. 30 is the overall structure of the network system including the user support system according to the fifth embodiment.

FIG. 30 shows the overall structure of the network system 5010, including the user support system 5016 according to the fifth embodiment of the present invention.

The user support system 5016 includes the originating server 5020, the chat server 5024, the recipe server 5026, and the travel server 5028. All of these servers are connected to the Internet 5014. The originating server 5020 includes an electronic collection of anticipated user commands and a command identification block that identifies the contents of a given user command. The command identification block is shared by the other servers in the user support system. The chat server 5024, the recipe server 5026, and the travel server 5028 each include a collection of action patterns used by the first agent in responding to commands, as well as a response block that enables the first agent to respond to the user.

As in the first embodiment, the originating server 5020, the chat server 5024, the recipe server 5026, and the travel server 5028 are configured as separate network nodes. In the following, these types of servers are generally referred to as specialized servers, and the agents hosted on them are referred to as expert agents.

A user command is sent to the originating server 5020 and its content is identified in the user command collection. An agent is then identified to respond to the command based upon the contents and the response block executes the response process. An agent on the chat server 5024, or the "chat agent", responds to general greetings such as "Hello". Likewise, the "recipe agent" responds to commands related to cooking, such as "Recommend a recipe." and the "travel agent" responds to commands related to travel, such as "Recommend a domestic travel destination". Each expert agent determines what kind of information the user wants by interacting with the user, and then helps them find it among the large amount of available information.

In this embodiment's user support system, the first agent will appear and interrupt the dialogue between the second agent and the user, initiating a conversation between the two agents. The user can gain insight into the ongoing processes or be presented with alternatives through this dialog between the agents. Additionally, the dialogue can be used to entertain and relax the user.

For instance, the user says, "What's new?" and the chat agent responds saying, "A shopping site offering a good dumpling is open." At this time, the recipe agent reacts to the key word "dumpling" and says, "Don't talk about dumplings without me." Then, if the user is interested in dumplings, the user may say, "Tell me a recipe for a good dumpling." and a conversation with the recipe agent ensues. Thus, when a specific keyword appears in the dialogue, an expert agent specializing in the field automatically appears and talks to the user so that the process can continue smoothly. While the system waits for a command from the user, the agents may continue to talk to each other. For instance, when the chat agent says, "Don't butt in with your joke when I am talking." the recipe agent may reply, "Don't say that. Let me join in." so that it could relax the user.

The commands that the first agent reacts to are not necessarily commands that relate to its specialized field. For instance, while the user and the chat agent talk about going to see cherry blossoms, the recipe agent may appear unexpectedly and interrupt saying, "Pudding rather than flowers. Would you like to know how to make a good pudding?"

The abstract of the process in FIG. 30 is almost the same as in the first embodiment, so only the differences are explained below.

When an expert agent responds to a user command, its content is sent to the originating server 5020, as denoted by URLs in FIG. 30. The originating server 5020 includes an additional command collection that is a collection of anticipated commands to which other agents should respond. The agent response is matched with the additional command collection, to identify the agent that should respond. If an agent is not identified, the system will wait for the next user command. If an agent is identified, the URL for that agent's specialized server is forwarded to the browser on the user terminal 5012, and the expert agent performs the response process as it is described above. The system then waits for the next user command.

When a user enters a new, normal command in response to the expert agent, the command is captured and sent to the originating server 5020. The originating server 5020 identifies the expert agent that should respond to the command and transmits the URL of that expert agent's specialized server to the user terminal 5012. The following sequence is repeated:

1. the originating server 5020 identifies the user command;
2. the originating server 5020 identifies the specialized server that should process the identified command;
3. the expert agent on the specialized server responds to the user;
4. any other expert agent responds to the expert agent response (this step is omitted if no other expert agents are found to respond); and
5. the expert agent requests, or prompts the user to make, a normal command.

Thus, the process always returns to the originating server 5020 and then begins again.

Figure 31:
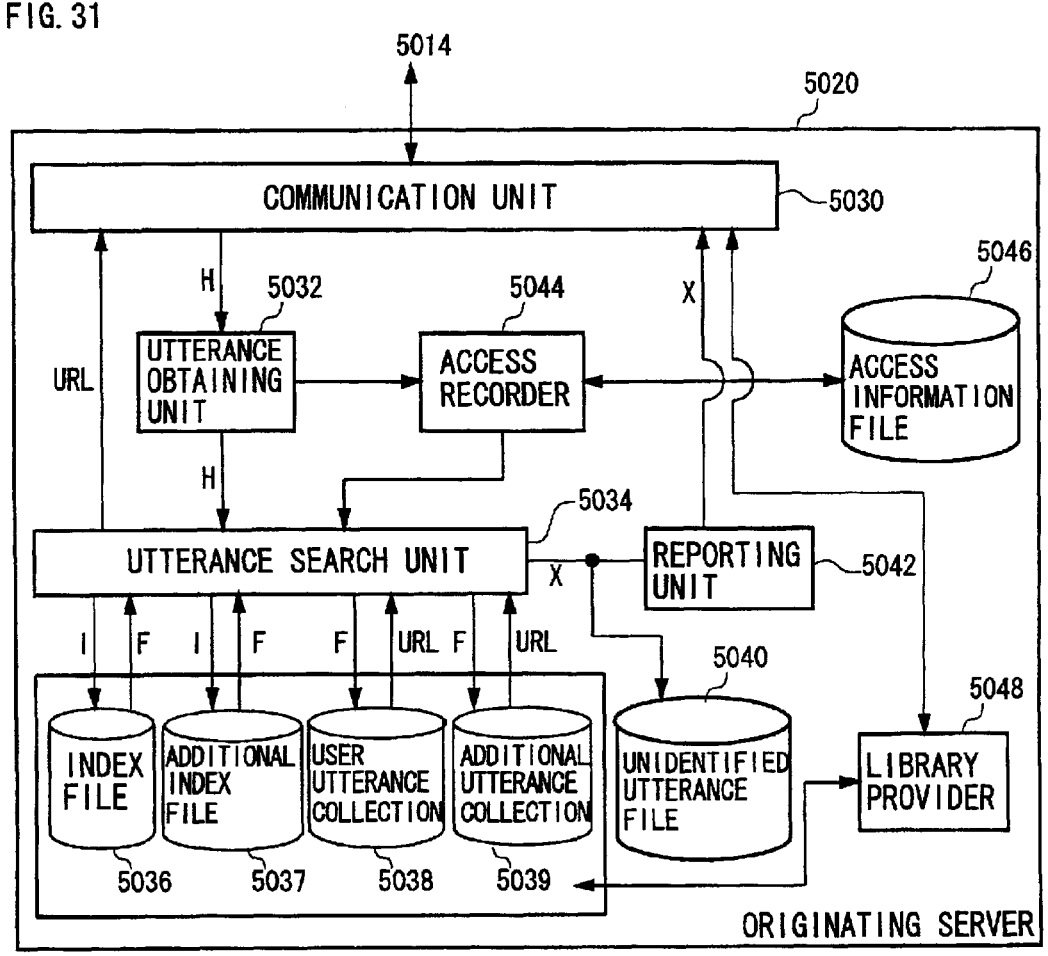
FIG. 31 is the internal structure of the originating server in the user support system.

FIG. 31 shows the internal structure of the originating server 5020. The originating server 5020 in this embodiment has functions similar to those in the first embodiment, so only the differences are explained below.

In this embodiment, the command obtaining unit 5032 not only captures a command from the user and sends it to the command search unit 5034, it also captures the response from the expert agent and sends it to the command search unit 5034 as well.

The additional index file 5037 is generated by arranging the anticipated commands stored in the additional command collection 5039 in the order of the Japanese syllabary. As is the case with the index file 5036, since the first character of the agent response is checked with this index file 5037, the search for the agent response can be conducted quickly, even if the additional command collection 5039 is very large.

When a command is identified using the index file 5037, the file descriptor for the file containing information such as the URL of the specialized server that should respond to the command is identified in the index file 5037, and the file in the additional command collection 5039 is opened to extract the proper URL. The additional command collection 5039 has, as does the user command collection 5038, one file devoted to each command. The extracted URL is then forwarded to the user terminal's 5012 browser via the communication unit 5030 and the browser in turn displays the response from the expert agent.

As is the case with the user command, when a statement exactly corresponding to the agent response is not found in the additional command collection 5039, the command search unit 5034 breaks the agent response into morphemes using a known method and finds the most probable command from the additional command collection 5039 by searching again using a logical AND of the morpheme's nouns or by similar processes. It is not necessary to notify the system administrator even if a probable command cannot be found. Although one of the expert agents must reply to a user command, there is no requirement for an agent to react to another agent's response. It is also unnecessary to provide a large number of responses to which agents should react. It is sufficient to provide such responses to the extent that another expert agent may appear with a frequency that does not interfere with the user. In addition, the user may set a level indicating how frequently the other agents may react to agent responses. In some cases the user may prohibit any agent, other than the one presently conversing, from appearing on the screen.

The library provider 5048 provides the user command collection to third parties both off-line and online. For instance, the user command collection can be provided off-line as a software package. However, in this embodiment it is provided online via the communication unit 5030. When the library provider 5048 receives a request for the user command collection through the communication unit 5030, it retrieves the user command collection 5038 and transmits it via the communication unit 5030. At this time the index file 5036, the additional index file 5037, and the additional command collection 5039 may also be transmitted. By offering the user command collection, new development by third parties can be promoted and the system as a whole can be enhanced.

When a specialized server's administrator develops a new agent action, the URL of the user command and its corresponding agent action is sent to the originating server 5020. The library provider 5048 then receives the information from the specialized server and registers the information in the index file 5036, the additional index file 5037, the user command collection 5038, and the additional command collection 5039. This improves the accuracy of the user command collection and makes enhancing the agent functions much easier.

The internal structure of the index file 5036, the user command collection 5038, and the access information file 5046 are the same as those in the first embodiment.

Figure 32:
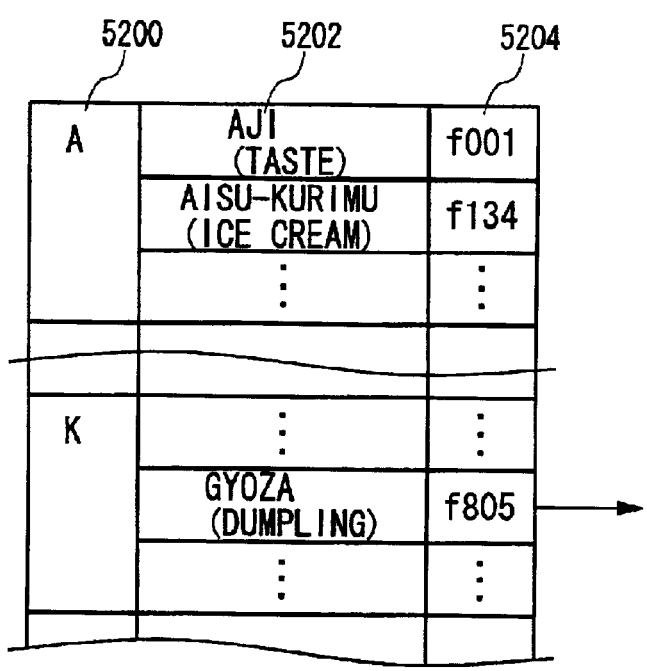
FIG. 32 is the internal structure of the additional index file in the originating server.
Figure 33:
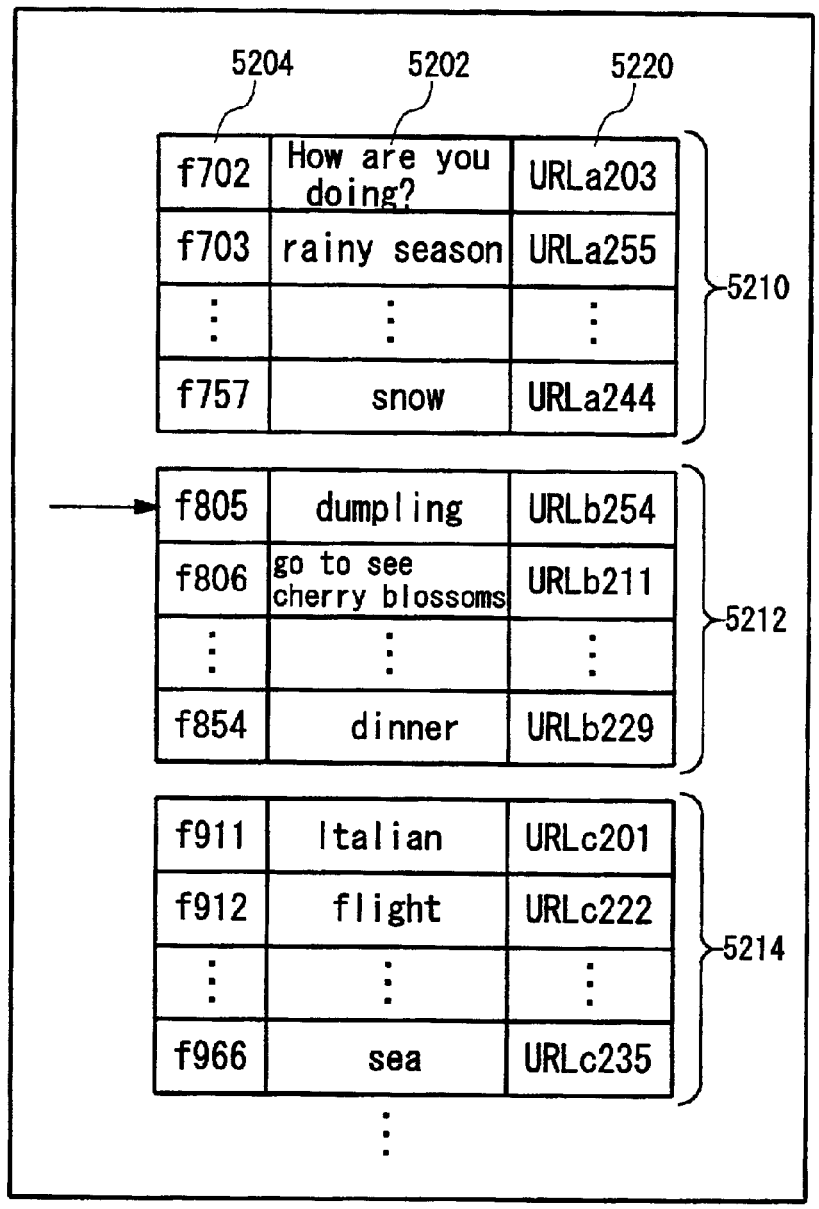
FIG. 33 is the internal structure of the additional command collection in the originating server.

FIG. 32 represents the internal structure of the additional index file 5037. FIG. 33 represents the internal structure of the additional command collection 5039. The additional index file 5037 has a Japanese syllabary column 5200, an agent response column 5202, and a file name column 5204. The agent responses are arranged in the order of the Japanese syllabary as the user commands are in the index file 5036.

The additional command collection 5039 has a file name column 5204, an agent response column 5202, and a page column 5220 indicating which specialized server should respond. For instance, the page of the specialized server to respond to the agent response "rainy season" is URLa255, and the response "rainy season" paired with URLa255 forms file f703. The agent responses for each specialized server are collected, and the additional index file 5037 and the additional command collection 5039 are linked together using file names. For instance, the file name f805 is recorded corresponding to the response "dumpling" in the additional index file 5037 and the file name points to the file f805 in the additional command collection 5039.

The chat server's 5024 internal structure, as an example of a specialized server, is the same as that in first embodiment. The user terminal's 5012 internal structure is also the same as that in the first embodiment.

Figure 34:
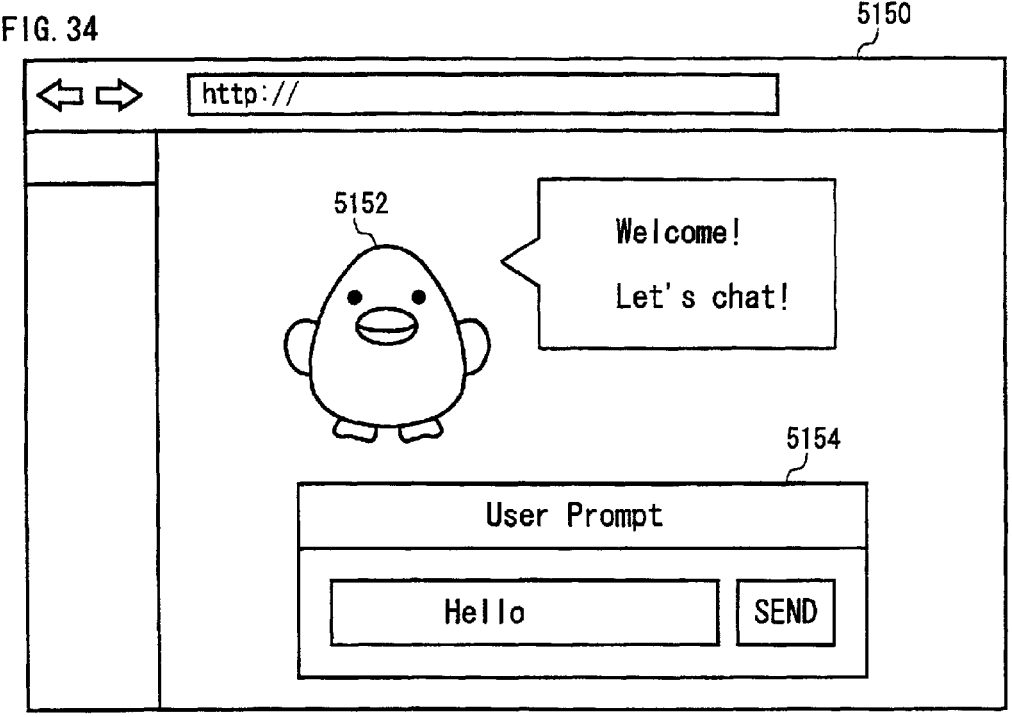
FIG. 34 shows the local agent displayed on screen when a user has activated the user terminal.

FIG. 34 shows the screen 5150 displayed when a user has activated the user terminal 5012. The local agent 5152 appears and says, "Welcome! Let's chat." The user enters "Hello" in the input field 5154 and presses the send button. The statement "Hello" is sent to the originating server 5020 as a process initiating command, the chat server 5024 is identified as the specialized server on the basis of the contents of the statement, and the user terminal 5012 is given access to the appropriate page.

Figure 35:
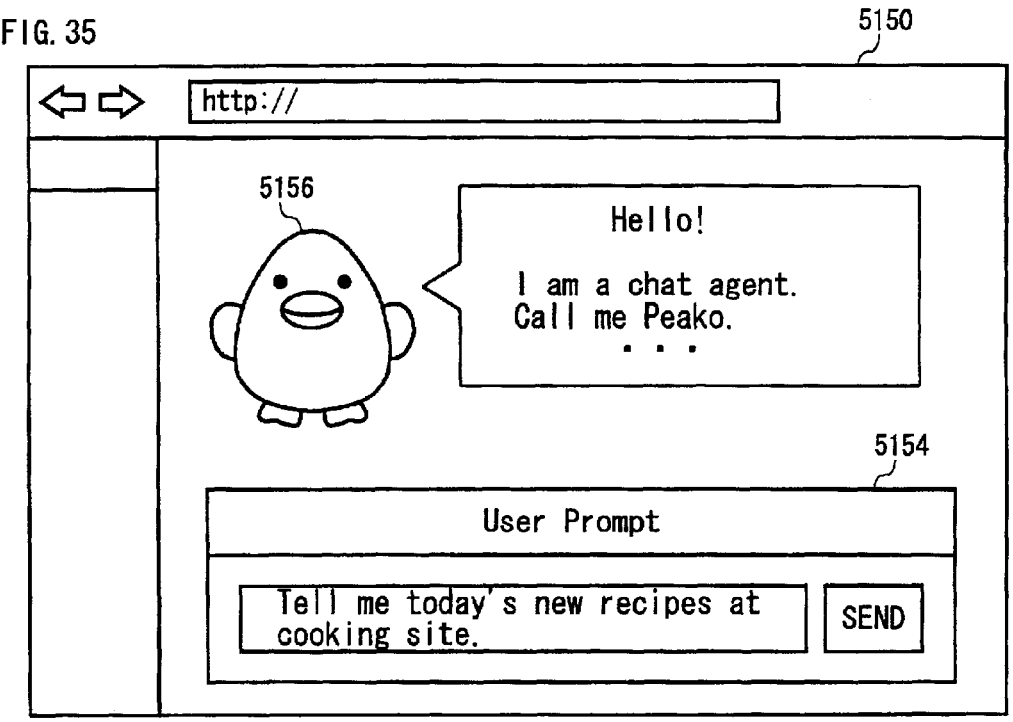
FIG. 35 shows the chat agent displayed on screen when a user enters a command.

FIG. 35 shows the screen 5150 displayed when the user enters a command. Here the chat agent 5156 appears, but the same image as the local agent 5152 is used in this embodiment, so the conversation appears to continue seamlessly. The chat agent 5156 says, "Hello. I am a chat agent. Call me Peako." When the user inputs "Tell me today's new recipes at cooking sites." and presses send, the command is received at the originating server 5020 and the page for the recipe server 5026 is identified. The URL of the identified page is then sent to the user terminal 5012 and the user terminal 5012 is given access to the page.

Figure 36:
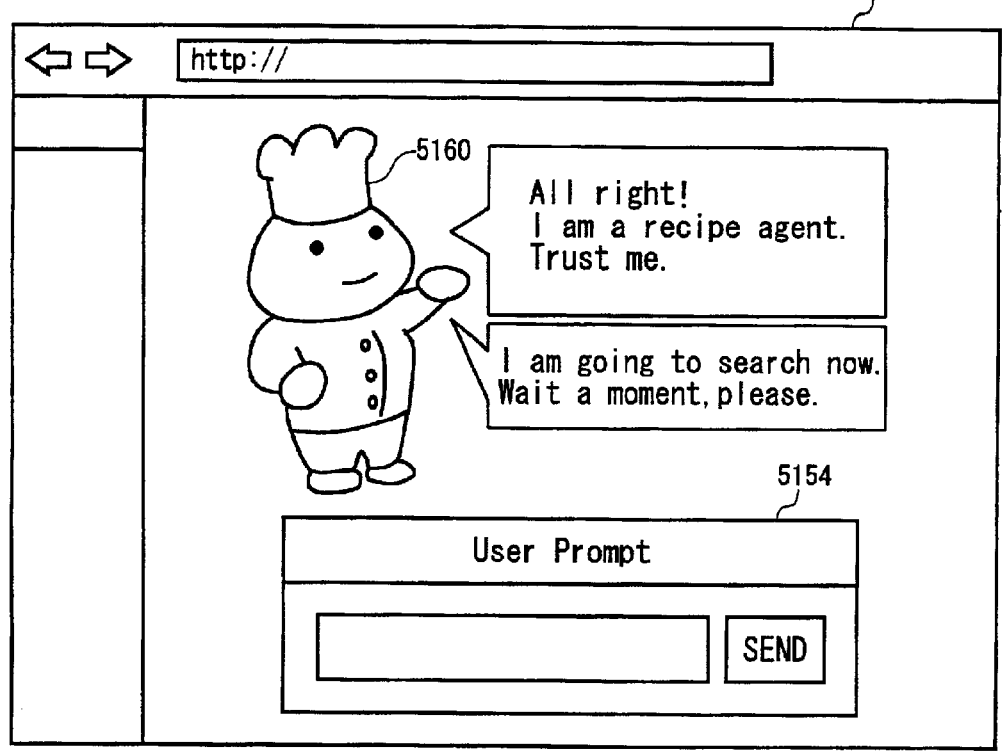
FIG. 36 shows the recipe agent displayed on screen when the user asks for a recipe.

FIG. 36 shows the screen 5150 displayed when the user asks for a recipe. The recipe agent 5160 appears and says, "Airight! I am a recipe agent. Trust me." then accesses the cooking site that the user has registered and obtains the new recipes from that site. In order to prevent the user from getting bored during the search, the agent says, "I am going to search now. Wait a moment, please." to inform the user that the search is being executed. Once the search is completed, the browser is given access to a page displaying the search result.

Figure 37:
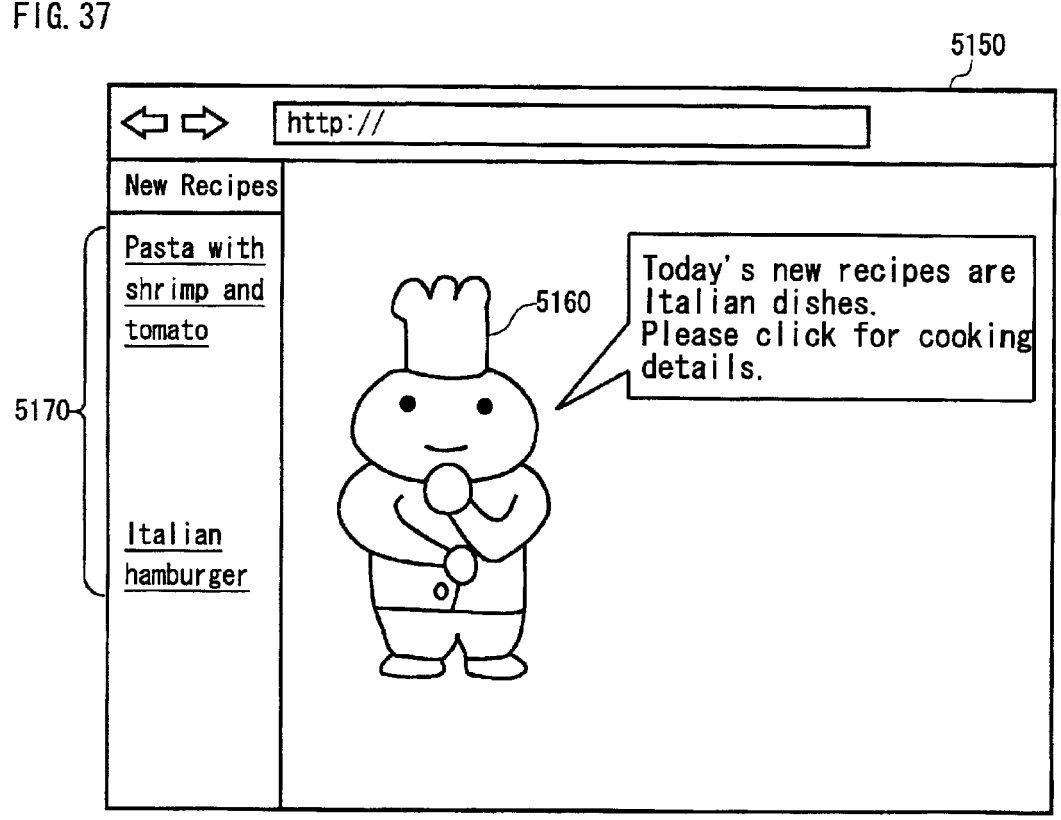
FIG. 37 shows how the recipe agent presents a search result to the user.

FIG. 37 shows the screen 5150 that displays the search result. The recipe agent 5160 says, "Today's new recipes are Italian dishes. Please click for cooking details." and the recipe titles 5170 obtained through the search are displayed. Each of the titles 5170 has a link to a page describing the recipe in detail. The recipe agent's 5160 response is sent to the originating server 5020 and matched with the additional command collection 5039. As a result, it is determined that the travel agent might react to the word "Italian". The browser in turn accesses the page corresponding to the travel server 5028 and the travel agent appears.

Figure 38:
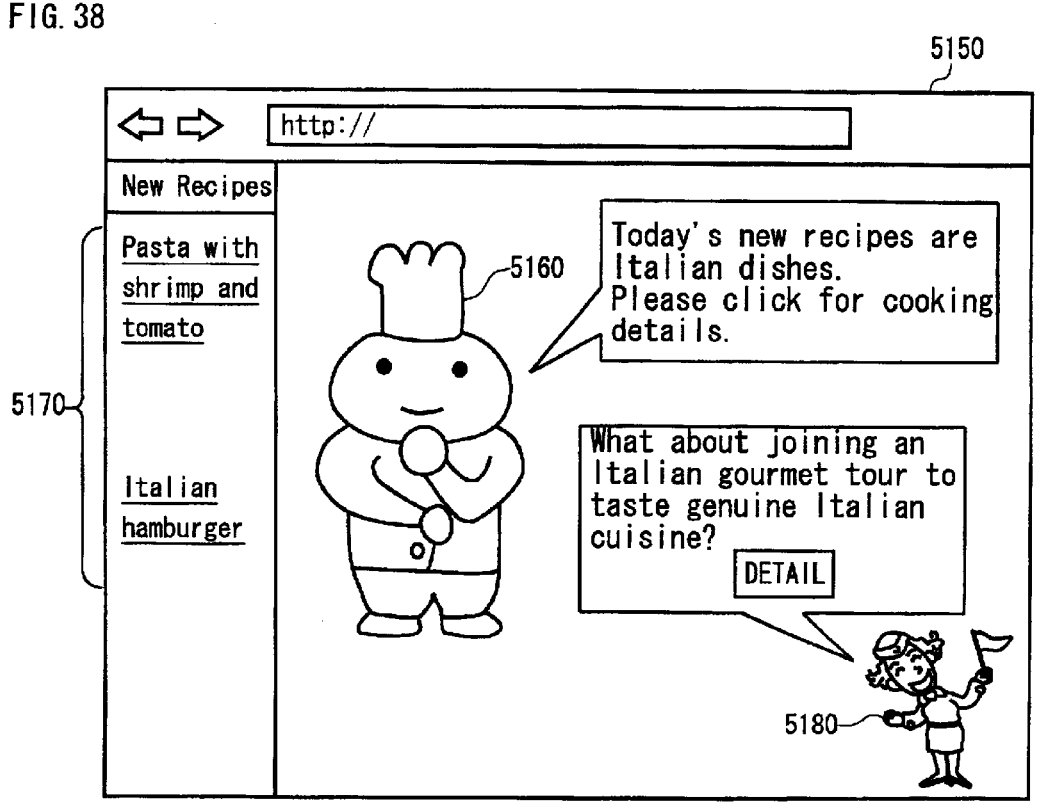
FIG. 38 shows the travel agent displayed on screen.

FIG. 38 shows the screen 5150 that is displayed when the travel agent appears. The travel agent 5180 says, "What about joining an Italian gourmet tour to taste genuine Italian cuisine?" The user may ignore the travel agent 5180 and continue to talk with the recipe agent 5160, or may initiate an exchange with the travel agent 5180.

Thus, each expert agent can serve both as the second agent that talks mainly with the user and as the first agent that interrupts the dialogue between the user and the second agent.

Although the command identification block is shared at the originating server 5020 in this embodiment, each specialized server may include both a command identification block and a response block. In such a configuration, both the user command collection and the agent action collection can be managed independently for each specialized field, making the management and maintenance of the agent easier. In any configuration, a central server may be provided to process all of the commands.

Figure 39:
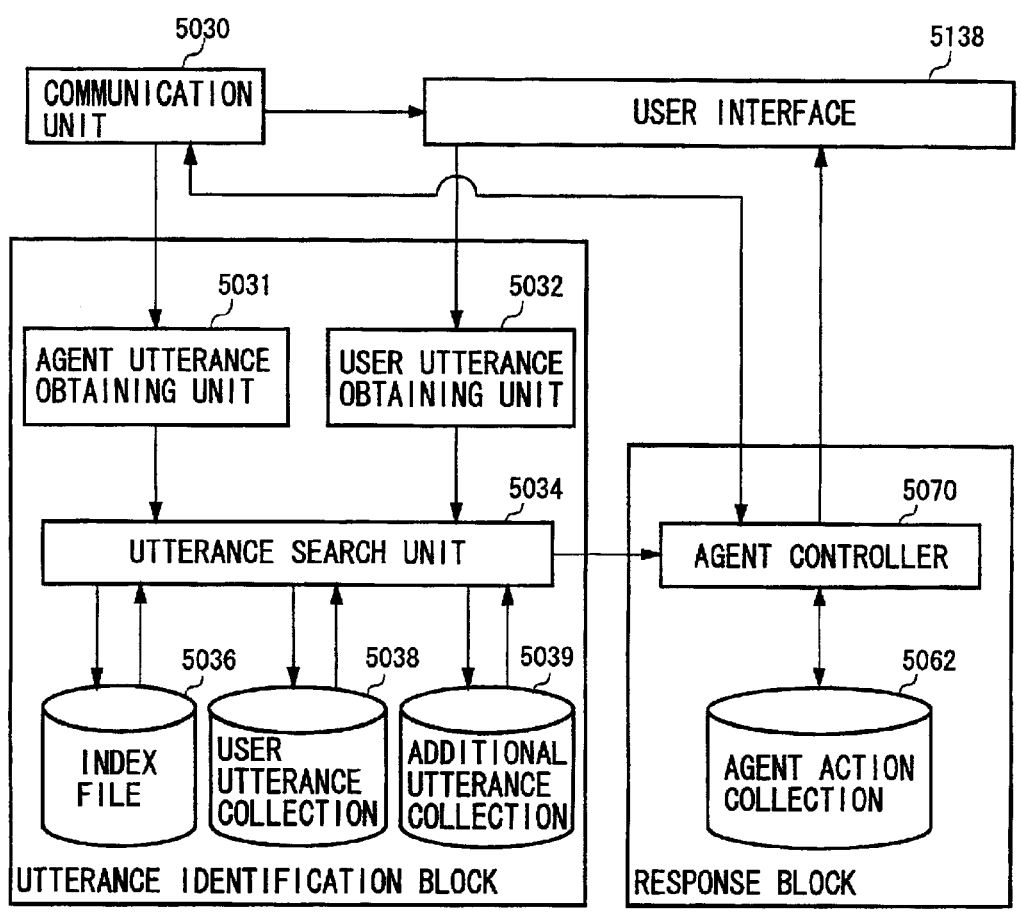
FIG. 39 is the overall structure of the user support apparatus according to the sixth embodiment.

FIG. 39 shows the overall structure of the user support apparatus according to the sixth embodiment. The user support apparatus in this embodiment is not a server that offers services via the network, but rather a stand-alone apparatus that offers services to a user. The components designated with the same numbers used in the fifth embodiment perform similar functions in this embodiment.

The agent on this apparatus performs functions similar to those of the local agent in the fifth embodiment. The agent obtains the user command entered through the user interface 5138 with the command obtaining unit 5032 and identifies the contents of the command using the command search unit 5034. The agent controller 5070 retrieves the page corresponding to the user command, which is stored in the agent action collection 5062, and the response process is executed.

The user may also converse with an external expert agent via the communication unit 5030. While the user is speaking with the external expert agent, the expert agent's response is displayed via the user interface 5138 and is captured by an agent response obtaining unit 5031. If the expert agent's response is matched with a response recorded in the additional command collection 5039, another agent on the apparatus appears and responds to the user.

Figure 40:
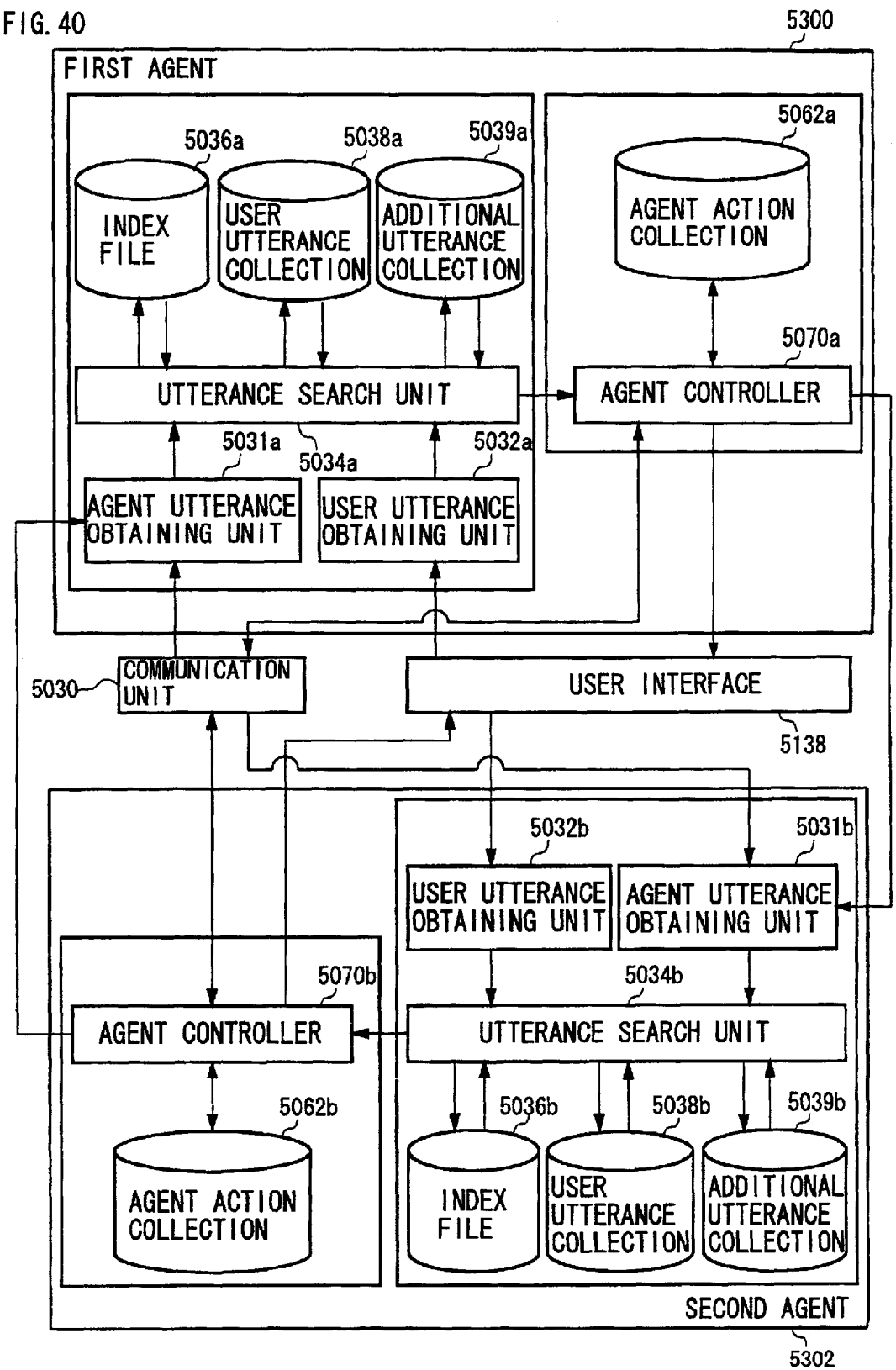
FIG. 40 is the overall structure of the user support apparatus according to the seventh embodiment.

FIG. 40 shows the overall structure of the user support apparatus according to the seventh embodiment. This user support apparatus is also a stand-alone apparatus like that in the sixth embodiment. However, the apparatus in this embodiment implements both the first agent 5300 and the second agent 5302, and the command identification block and the response block are symmetrically provided for the first and second agents. The first and second agents converse with the user like the expert agents in the fifth embodiment. While the first agent is leading the conversation with the user, the second agent reacts to the dialogue at appropriate times. Conversely, while the second agent is leading the conversation with the user, the first agent reacts to the dialogue at appropriate times.

Although the user command collection and the additional command collection are separately provided in this embodiment, the additional command collection may be incorporated into the user command collection. When the command identification block's process enters the final stage, the user command and the agent response may be matched with the user command collection without discriminating between the two.

What is claimed is:

1. A user support apparatus comprising:
   an utterance identification block which has an electronic collection of user utterances, and identifies a content of a given user utterance, and
   a response block which has an electronic collection of action patterns for a first agent for responding to user utterances, and enables the first agent to respond to the user utterances,
   wherein the utterance identification block has an additional collection of anticipated utterances to which the first agent should react among utterances that a second agent makes to the user, and identifies a content of an utterance of the second agent if the utterance of the second agent exists in the additional utterance collection, and wherein the response block has an additional collection of action patterns for the first agent for reacting to the utterances of the second agent, and enables the first agent to occasionally react to the utterances of the second agent, and wherein the additional utterance collection is incorporated into the user utterance collection, and the user utterance and the second agent utterance are matched with the integrated user utterance collection without any discrimination, when a process of the utterance identification block comes to at least a final stage.

2. A user support apparatus comprising:

an utterance identification block which has an electronic collection of user utterances, and identifies a content of a given user utterance; and a response block which has an electronic collection of action patterns for a first agent for responding to user utterances, and enables the first agent to respond to the user utterances, wherein the utterance identification block has an additional collection of anticipated utterances to which the first agent should react among utterances that a second agent makes to the user, and identifies a content of an utterance of the second agent if the utterance of the second agent exists in the additional utterance collection, and wherein the response block has an additional collection of action patterns for the first agent for reacting to the utterances of the second agent, and enables the first agent to occasionally react to the utterances of the second agent, and wherein both the first agent and the second agent are implemented on this apparatus, and the utterance identification block and the response block are symmetrically provided for the first agent and the second agent, and while the second agent mainly responds to the user instead of the first agent, the first agent occasionally reacts to the utterances of the second agent.

3. A user support system comprising a plurality of user support apparatus connected to a network as independent network nodes, wherein each of the apparatus is provided according to each specialized field, and the additional utterance collection, the agent action collection, and the additional action collection of each user support apparatus are generated according to each specialized field, wherein each user support apparatus comprises:

an utterance identification block which has an electronic collection of user utterances, and identifies a content of a given user utterance; and a response block which has an electronic collection of action patterns for a first agent for responding to user utterances and enables the first agent to respond to the user utterances, wherein the utterance identification block has an additional collection of anticipated utterances to which the first agent should react among utterances that a second agent makes to the user, and identifies a content of an utterance of the second agent if the utterance of the second agent exists in the additional utterance collection, and wherein the response block has an additional collection of action patterns for the first agent for reacting to the utterances of the second agent, and enables the first agent to occasionally react to the utterances of the second agent.

4. The system of claim 3, wherein the plural user support apparatus include the respective response blocks therein and shares the utterance identification block at any one of the network nodes.

5. The system of claim 3, wherein each user support apparatus includes the first agent on the apparatus, and if the first agent appears on any other apparatus, the first agent acts as a second agent on said other apparatus.

6. The system of claim 3, wherein the utterance identification block includes:

an utterance search unit which searches the utterance of the user in the user utterance collection; and a reporting unit which notifies a system administrator when the user utterance is not found in the user utterance collection.

7. The system of claim 6, wherein the utterance identification block further includes an index storing unit that stores an index of contents of the user utterance collection, and the search unit initially searches the given user utterance in the index storing unit.

8. The system of claim 3, further including a library providing unit which offers the user utterance library to a third party off line or on line.

* * * * *